United States Patent
Onishi

(10) Patent No.: US 12,143,164 B2
(45) Date of Patent: Nov. 12, 2024

(54) INTERFERENCE DETECTION SYSTEM, INTERFERENCE DETECTION APPARATUS, INTERFERENCE DETECTION METHOD, AND INTERFERENCE DETECTION PROGRAM

(71) Applicant: NEC Corporation, Tokyo (JP)

(72) Inventor: Takeo Onishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 613 days.

(21) Appl. No.: 17/296,630

(22) PCT Filed: Nov. 27, 2019

(86) PCT No.: PCT/JP2019/046352
§ 371 (c)(1),
(2) Date: May 25, 2021

(87) PCT Pub. No.: WO2020/111115
PCT Pub. Date: Jun. 4, 2020

(65) Prior Publication Data
US 2022/0029717 A1    Jan. 27, 2022

(30) Foreign Application Priority Data
Nov. 28, 2018   (JP) ................... 2018-222293

(51) Int. Cl.
*H04B 17/345* (2015.01)
*H04W 24/08* (2009.01)

(52) U.S. Cl.
CPC .......... *H04B 17/345* (2015.01); *H04W 24/08* (2013.01)

(58) Field of Classification Search
CPC ..... H04B 17/345; H04W 24/08; H04W 84/12
See application file for complete search history.

(56) References Cited

U.S. PATENT DOCUMENTS

| 2007/0237168 A1 | 10/2007 | Courtay et al. |
| 2012/0157007 A1* | 6/2012 | Yoneyama ................ H04L 1/20 455/67.14 |

(Continued)

FOREIGN PATENT DOCUMENTS

| JP | 2003-198454 A | 7/2003 |
| JP | 2007-189695 A | 7/2007 |

(Continued)

OTHER PUBLICATIONS

IEEE Communications Magazine:Preamble Design, System Acquisition, and Determination in Modern OFDMA Cellular Communications—Jul. 2011—Michael Mao Wang, Avneesh Agrawal, Aamod Khandekar, and Sandeep Aedudodla; (Year: 2011).*

(Continued)

*Primary Examiner* — Mohammed S Chowdhury

(57) ABSTRACT

An interference detection system includes a plurality of radio frame acquisition apparatuses and an interference detection apparatus. The interference detection apparatus includes radio frame information reception part, radio frame information storage part, simultaneous frame extraction part, and interference detection part. A radio frame information reception part receives the radio frame information transmitted from the radio frame acquisition apparatus. A radio frame information storage part stores the received radio frame information. A simultaneous frame extraction part extracts first radio frame, and second radio frame demodulated simultaneously or almost simultaneously with first radio frame. An interference detection part determines whether or not first radio frame and second radio frame are interfering with each other on the basis of whether or not there exists(exist) radio frame acquisition apparatus(es) which has(have) demodulated first radio frame and second (Continued)

radio frame simultaneously or almost simultaneously, among a plurality of the radio frame acquisition apparatuses.

16 Claims, 14 Drawing Sheets

(56) References Cited

U.S. PATENT DOCUMENTS

| | | | |
|---|---|---|---|
| 2012/0252442 A1 | 10/2012 | Fu et al. | |
| 2013/0223250 A1* | 8/2013 | Matsuo | H04B 17/345 |
| | | | 370/252 |
| 2014/0086089 A1* | 3/2014 | Huang | H04W 24/08 |
| | | | 370/252 |
| 2015/0149839 A1 | 5/2015 | Olgaard | |
| 2015/0263920 A1 | 9/2015 | Nagata | |
| 2017/0207866 A1* | 7/2017 | Fujita | H04B 17/318 |
| 2019/0306885 A1* | 10/2019 | Hirata | H04W 84/12 |

FOREIGN PATENT DOCUMENTS

| | | |
|---|---|---|
| JP | 2008-205651 A | 9/2008 |
| JP | 2014-508487 A | 4/2014 |
| JP | 2014-515582 A | 6/2014 |
| JP | 5915776 B2 | 5/2016 |
| JP | 2017-130726 A | 7/2017 |
| WO | 2015/077087 A1 | 5/2015 |

OTHER PUBLICATIONS

International Search Report for PCT Application No. PCT/JP2019/046352, mailed on Jan. 7, 2020.

English translation of Written opinion for PCT Application No. PCT/JP2019/046352, mailed on Jan. 7, 2020.

* cited by examiner

FIG. 5

RADIO FRAME INFORMATION

| TIME | ACQUISITION APPARATUS | TRANSMISSION SOURCE | DESTINATION | SEQUENCE NUMBER |
|---|---|---|---|---|
| 1537412405001 | 10-1 | 50-1 | 40-1 | 10 |
| 1537412405001 | 10-2 | 50-2 | 40-1 | 501 |
| 1537412405001 | 10-3 | 50-1 | 40-1 | 10 |
| 1537412405001 | 10-3 | 50-2 | 40-1 | 501 |
| 1537412405006 | 10-2 | 50-1 | 40-1 | 502 |
| 1537412405007 | 10-3 | 50-2 | 40-1 | 502 |
| ... | ... | ... | ... | ... |

INTERFERENCE DETECTION SYSTEM, INTERFERENCE DETECTION APPARATUS, INTERFERENCE DETECTION METHOD, AND INTERFERENCE DETECTION PROGRAM

REFERENCE TO RELATED APPLICATION

This application is a National Stage Entry of PCT/JP2019/046352 filed on Nov. 27, 2019, which claims priority from Japanese Patent Application 2018-222293 filed on Nov. 28, 2018, the contents of all of which are incorporated herein by reference, in their entirety.

FIELD

The present invention relates to an interference detection system, an interference detection apparatus, an interference detection method, and an interference detection program.

BACKGROUND

With development of communication technology and data analysis/utilization technology, movement to collect/analyze and utilize data from various apparatuses through communication, in particular, a radio communication function is becoming active. When collecting data from a lot of apparatuses using a wireless LAN (Local Area Network), it is necessary to densely arrange access points (AP). On the other hand, because the number of channels which can be used in the wireless LAN is restricted, influence of communication quality degradation due to interference becomes great when a lot of APs are arranged.

Factors of degradation of radio communication quality are degradation of propagation environment due to shielding in addition to interference, and it is necessary to correctly estimate the factors in order to appropriately deal with a situation when radio quality degradation occurs.

An example of a technology to determine that interference is an factor as a degradation factor of the radio quality is described in Patent Literatures (PTLs) 1 and 2. In PTL 1, under an environment where interference does not occur, an AP and a radio terminal (STA; STAtion) learn a characteristic curve of Received Signal Strength Indication (RSSI) of a radio frame received by themselves and a packet error rate (PER). When RSSI and PER of an observed radio frame deviate from the learned characteristic curve, it is determined that the interference is occurring. In PTL 2, occurrence of interference is detected by elongated response time from trying to transmit a radio frame to a terminal by AP to reception of an ACK (ACKnowledgement) frame for the radio frame to be transmitted from the terminal.

By these disclosed technologies, it becomes possible for an AP or an STA to determine whether or not quality of radio communication performed between own terminal and an opposite terminal is degraded due to radio wave interference.

PTL 1: JP5915776B
PTL 2: JP2017-130726A

SUMMARY

By the technologies described above, it is possible to determine whether a degradation factor of radio quality is interference. However, in the above technologies, there is a problem that it is necessary to incorporate a special function into an AP or an STA for determining the radio quality degradation factor.

For example, in a method of PTL 1, it is necessary to additionally implement, into the AP and the STA, a function to measure RSSI and PER and to determine presence or absence of interference based thereon. Furthermore, in a method of PTL 2, it becomes necessary to additionally implement, into the AP, a function to measure response time from a time when trying to transmit a radio frame to reception of an ACK (ACKnowledgement) for the radio frame, and to determine presence or absence of interference on the basis of response time.

However, it is not possible in almost all cases to additionally implement a function into a commercially available AP. Furthermore, also as to an STA, although it may be possible to implement the above function with respect to high-performance STAs, such as a smart phone and a PC (Personal Computer), it is not possible to additionally implement it into single function devices, such as a camera and so on. Therefore, in most cases, it is difficult to apply technologies disclosed in PTLs 1 and 2 to radio apparatuses already in use.

It is a main object of the present invention to provide an interference detection system, an interference detection apparatus, an interference detection method, and an interference detection program which contribute to detect presence or absence of radio wave interference without modifying radio apparatuses already in use.

According to a first aspect of the present invention and the disclosure, there is provided an interference detection system, including:

a plurality of radio frame acquisition apparatuses; and
an interference detection apparatus,
wherein
each of a plurality of the radio frame acquisition apparatuses includes: a radio frame acquisition part which demodulates received radio frames; and
a radio frame information transmission part which transmits radio frame information acquired by the radio frame acquisition part to the interference detection apparatus, and
wherein
the interference detection apparatus comprises:
a radio frame information reception part which receives the radio frame information transmitted from the radio frame acquisition apparatus(es);
a radio frame information storage part which stores the received radio frame information;
a simultaneous frame extraction part which extracts a first radio frame, and a second radio frame demodulated simultaneously or almost simultaneously with the first radio frame from the radio frame information storage part; and
an interference detection part which determines whether or not the first radio frame and the second radio frame are interfering with each other on the basis of whether or not there exists(exist) a radio frame acquisition apparatus(es) which has(have) demodulated the first radio frame and the second radio frame simultaneously or almost simultaneously, among a plurality of the radio frame acquisition apparatuses.

According to a second aspect of the present invention and the disclosure, there is provided an interference detection apparatus, including:

a radio frame information storage part which stores radio frame information with respect to radio frames acquired by each of a plurality of radio frame acquisition apparatuses;

a simultaneous frame extraction part which extracts a first radio frame, and a second radio frame demodulated simultaneously or almost simultaneously with the first radio frame, from the radio frame information storage part; and an interference detection part which determines whether or not the first radio frame and the second radio frame are interfering with each other on the basis of whether or not there exists(exist) a radio frame acquisition apparatus(es) which has(have) demodulated the first radio frame and the second radio frame simultaneously or almost simultaneously, among a plurality of the radio frame acquisition apparatuses.

According to a third aspect of the present invention and the disclosure, there is provided an interference detection method, in an interference detection system which detects interference of radio waves, including:

demodulating radio frames;

storing radio frame information with respect to the demodulated radio frames;

extracting a first radio frame, and a second radio frame demodulated simultaneously or almost simultaneously with the first radio frame, from the stored radio frame information; and determining whether or not the first radio frame and the second radio frame are interfering with each other on the basis of whether or not there exists(exist) a radio frame acquisition apparatus(es) which has(have) demodulated the first radio frame and the second radio frame simultaneously or almost simultaneously.

According to a fourth aspect of the present invention and the disclosure, there is provided an interference detection program that causes a computer to execute processings, including:

storing radio frame information with respect to radio frames acquired by each of a plurality of radio frame acquisition apparatuses;

extracting a first radio frame, and a second radio frame demodulated simultaneously or almost simultaneously with the first radio frame, from the stored radio frame information; and determining whether or not the first radio frame and the second radio frame are interfering with each other on the basis of whether or not there exists(exist) a radio frame acquisition apparatus(es) which has(have) demodulated the first radio frame and the second radio frame simultaneously or almost simultaneously, among a plurality of the radio frame acquisition apparatuses.

Please note that this program can be recorded on a computer readable recording medium. The recording medium can be a non-transit one, such as a semiconductor memory, a hard disk, a magnetic recording medium, an optical recording medium and so on. The present invention can also be implemented as a computer program product.

According to each aspect of the present invention and the disclosure, there is provided an interference detection system, an interference detection apparatus, an interference detection method, and an interference detection program which contribute to detect presence or absence of radio wave interference without modifying radio apparatuses already in use.

BRIEF DESCRIPTION OF DRAWINGS

FIG. 5 is a diagram conceptually illustrating an example of radio frame information stored in radio frame information storage part.

PREFERRED MODES

First, an outline of an example embodiment of the present invention will be described. Please note, in the following outline, reference signs of the drawings are denoted to each element as an example for the sake of convenience to facilitate understanding and description of this outline is not intended to any limitation. Furthermore, an individual connection line between blocks in drawings and so on includes both one-way and two-way directions. A one-way arrow schematically illustrates a principal signal (data) flow and does not exclude bidirectionality. Furthermore, while not illustrated, an input port(s) and an output port(s) respectively exist at input terminals and output terminals of each connection line in circuit diagrams, block diagrams, internal configuration diagrams, connection diagrams and so on shown in the disclosure of the present application. The same applies to the input/output interfaces.

Figure 1:
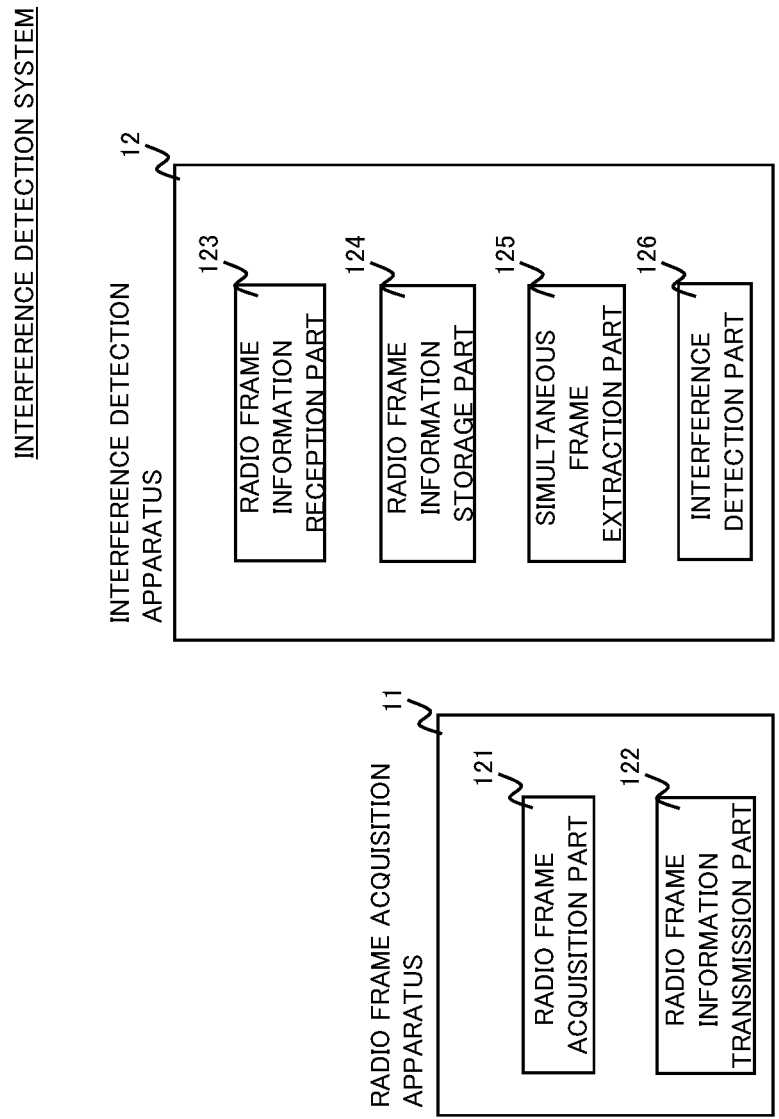
FIG. 1 is a diagram illustrating an outline of an example embodiment.

An interference detection system according to an example embodiment includes a plurality of radio frame acquisition apparatuses 11 and an interference detection apparatus 12 (refer to FIG. 1). Each of a plurality of the radio frame acquisition apparatuses 11 includes a radio frame acquisition part 121 which demodulates received radio frames and a radio frame information transmission part 122 which transmits information of the radio frames acquired by the radio frame acquisition part 121 to the interference detection apparatus 12. The interference detection apparatus 12 includes a radio frame information reception part 123, a radio frame information storage part 124, a simultaneous frame extraction part 125 and an interference detection part 126. The radio frame information reception part 123 receives the radio frame information transmitted from the radio frame acquisition apparatus 11. The radio frame information storage part 124 stores received radio frame information. The simultaneous frame extraction part 125 extracts a first radio frame, and a second radio frame which has been demodulated simultaneously or almost simultaneously with the first radio frame, from the radio frame information storage part 124. The interference detection part 126 determines whether or not the first radio frame and the second radio frame are interfering with each other on the basis of whether or not there exists(exist) a radio frame acquisition apparatus(es) 11 which has(have) demodulated the first radio frame and the second radio frame simultaneously or almost simultaneously, among a plurality of the radio frame acquisition apparatuses 11.

In the interference detection system according to the above example embodiment, the interference detection apparatus 12 collects the radio frame information from a plurality of the radio frame acquisition apparatus 11 and stores it. Then, the interference detection apparatus 12 determines presence or absence of interference between radio frames on the basis of whether or not there exists(exist) a radio frame acquisition apparatus(es) 11 which has(have) acquired radio frames whose contents are different each other (the first radio frame and the second radio frame) practically simultaneously. As a result, it is possible to detect, with high accuracy, presence or absence of radio wave interference without modifying existing radio apparatuses (for example, access points and radio communication terminals). That is, according to the interference detection system according to the above example embodiment, it is possible to detect presence or absence of radio wave interference without modifying radio apparatuses already in use by additionally introducing a radio frame acquisition apparatus which acquires radio frame information and an interference detection apparatus into a radio system already in use.

A concrete example of embodiment will be described in more detail below with reference to drawings. Please note that the same reference signs are assigned to the same components in each example embodiment and the description thereof will be omitted.

First Example Embodiment

Figure 2:
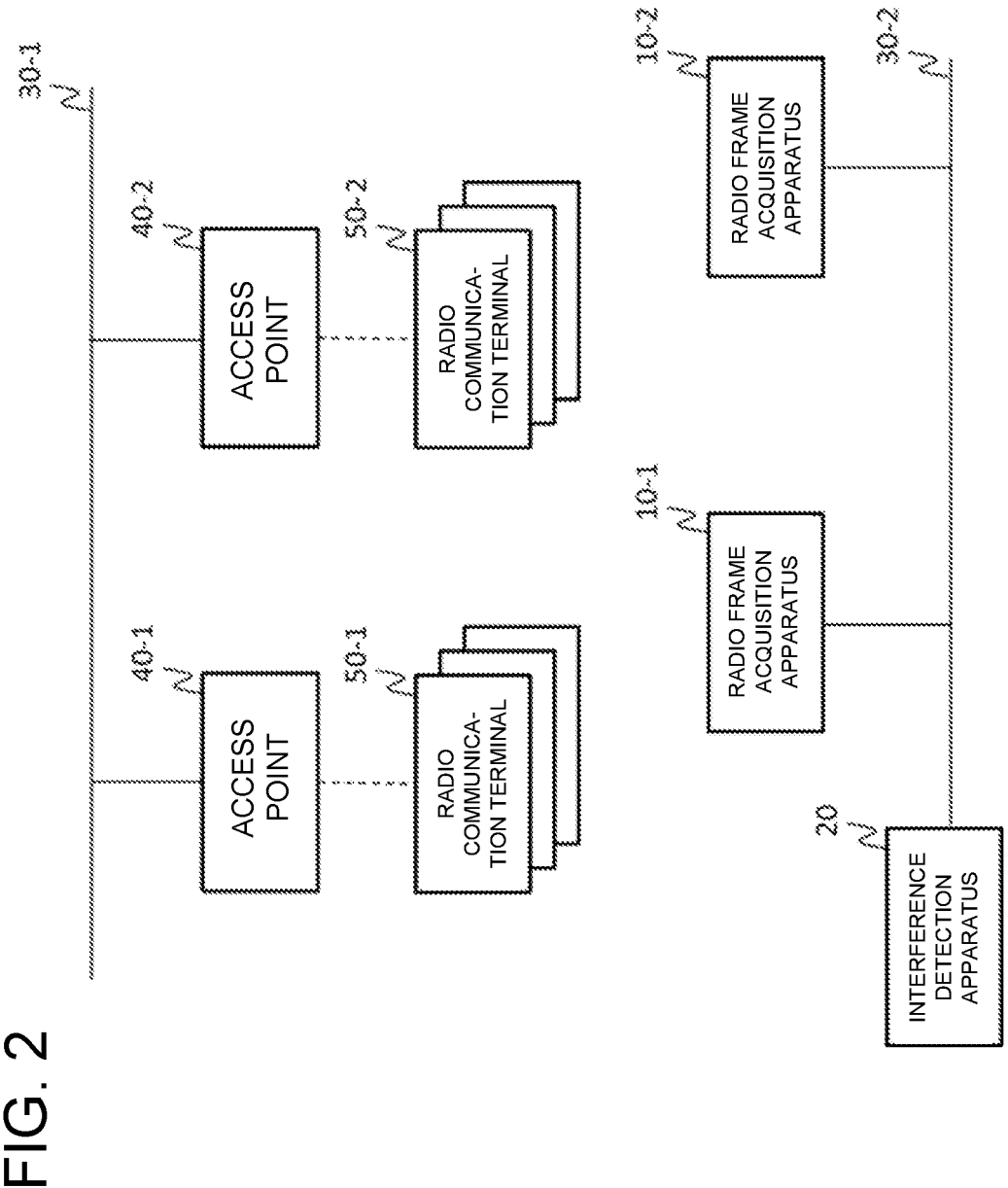
FIG. 2 is a block diagram illustrating an example of a configuration of a system according to a first example embodiment.

A first example embodiment will be described in more detail with reference to drawings.
[Description of Configuration]
FIG. 2 is a diagram illustrating an example of a configuration of a system according to the first example embodiment of the present invention. With reference to FIG. 2, a system in the first example embodiment of the present invention is made up by a plurality of radio frame acquisition apparatuses 10, an interference detection apparatus 20, a communication network (hereinafter, simply referred to "network",) 30, access points 40, and radio communication terminals 50.

The system may be configured by the arbitrary number of a radio frame acquisition apparatus(es) 10, an access point(s) 40, and a radio communication terminal(s) 50. Please note that when it is necessary to distinguish individual apparatuses, an explanation will be made by assigning a branch number in such way as "a radio frame acquisition apparatus 10-1".

The radio frame acquisition apparatuses 10 and the interference detection apparatus 20 are communicably connected through the network 30. The access points 40 are also connected to each other through the network 30 and the access point 40 and the radio communication terminals 50 are connected by a radio communication technology, such as a wireless LAN. Although an explanation will be made below by taking the wireless LAN for example, the system of the present invention does not limit a target to the wireless LAN. For example, Bluetooth (registered trademark) may be a target as a radio communication and LTE (Long Term Evolution) may be a target, too.

Furthermore, although a radio frame acquisition apparatus 10 and an interference detection apparatus 20 will be explained as a different apparatus from an access point 40 and a radio communication terminal 50, these apparatuses may be implemented in a form of being incorporated in an access point 40 or a radio communication terminal 50. For example, the above apparatuses are implemented in an access point 40 for a redundant configuration and operated as a part of the interference detection system at normal time. In this case, for example, when a radio frame acquisition apparatus 10 is implemented into an access point, the radio frame acquisition apparatus 10 implemented in the access point become to acquire a radio frame transmitted from own apparatus and a radio frame transmitted from other apparatuses. Furthermore, when a malfunction occurs in other access point, it becomes to be possible to use as a spare access point.

A radio frame acquisition apparatus 10 receives a radio wave in which a radio frame is encoded transmitted by an access point 40 or a radio communication terminal 50 and demodulates the radio frame included in the radio wave. Furthermore, the radio frame acquisition apparatus 10 transmits radio frame information with respect to the demodulated radio frame to an interference detection apparatus 20.

The radio frame information at least includes information uniquely identifying the radio frame acquisition apparatus 10 which has demodulated a radio frame, time at which the radio frame has been demodulated, and a part of or all of data included in the radio frame.

An interference detection apparatus 20 determines whether or not radio frames which an access point(s) 40 or a radio communication terminal(s) 50 transmits have interfered on the basis of the radio frame information acquired from a radio frame acquisition apparatus(es) 10.

A network(s) 30 connects components each other as shown in FIG. 2 and enables data to be exchanged with each other.

An access point 40 communicates with a plurality of radio communication terminals 50 using a radio technology and relays communication with other communication apparatus(es) (not illustrated in FIG. 2) connected to other radio communication terminals 50 or a network. Please note that, with respect to a communication technology itself which an access point 40 uses for relaying, detailed description thereof in the present application will be omitted since it is possible to employ a commonly used technology.

A radio communication terminal 50 performs communication with an access point 40 using a radio communication technology and performs communication with other radio apparatuses through the access point 40. Please note that the radio communication terminal 50 is not necessarily to perform communication through an access point 40 and the radio communication terminals 50 may directly performs radio communication with each other.

Next, a configuration of a radio frame acquisition apparatus 10 will be described.

Figure 3:
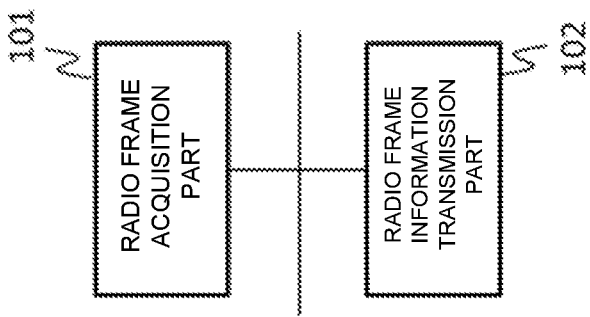
FIG. 3 is a block diagram illustrating an example of a configuration of a radio frame acquisition apparatus according to the first example embodiment.

FIG. 3 is a diagram illustrating an example of a configuration of a radio frame acquisition apparatus 10. As shown in FIG. 3, a radio frame acquisition apparatus 10 is made up by a radio frame acquisition part 101 and a radio frame information transmission part 102.

A radio frame acquisition part 101 receives a radio wave in which a radio frame is encoded transmitted by an access point 40 or a radio communication terminal 50 and demodulates the radio frame included in the radio wave. Furthermore, a radio frame acquisition part 101 generates radio frame information with respect to the demodulated radio frame.

A radio frame information transmission part 102 transmits radio frame information generated by a radio frame acquisition part 101 to an interference detection apparatus 20 through a network and so on. Please note that a method shown in the present example is just one example and radio frame information is not necessarily to be transmitted through a network as long as radio frame information generated by a radio frame acquisition part 101 can be passed to an interference detection apparatus 20. For example, a configuration may be employed, in which radio frame information is duplicated in a portable storage apparatus such as USB (Universal Serial Bus) memory and the radio frame information is duplicated to an interference detection apparatus 20 by way of the portable storage apparatus.

Next, a configuration of an interference detection apparatus 20 will be described.

Figure 4:
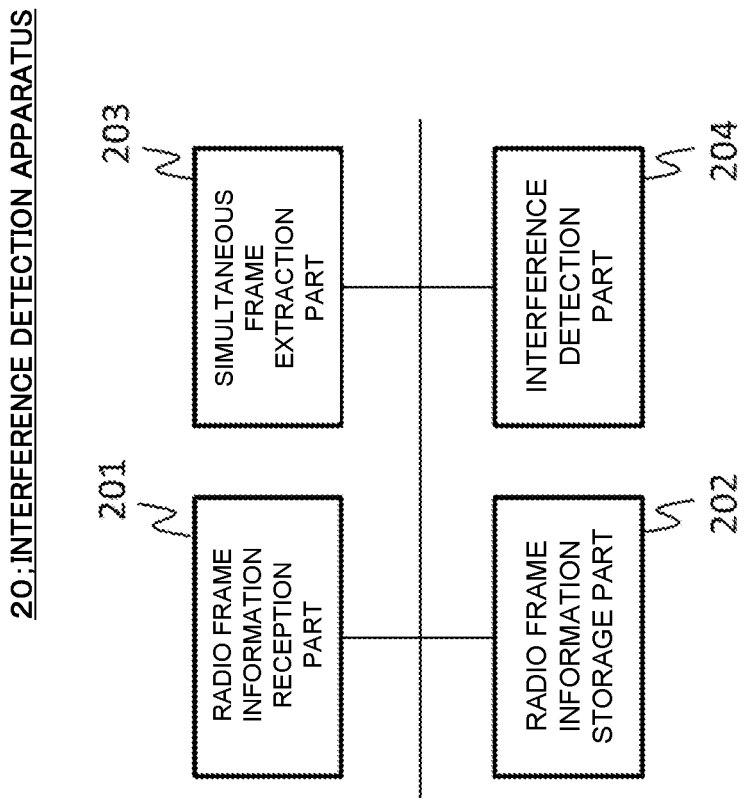
FIG. 4 is a block diagram illustrating an example of a configuration of interference detection apparatus according to the first example embodiment.

FIG. 4 is a diagram illustrating an example of a configuration of interference detection apparatus 20. As shown in FIG. 4, an interference detection apparatus 20 is made up by a radio frame information reception part 201, a radio frame information storage part 202, a simultaneous frame extraction part 203, and an interference detection part 204.

A radio frame information reception part 201 acquires radio frame information through a network and so on from a radio frame acquisition apparatus 10. Please note that a method of acquiring radio frame information from a radio frame acquisition apparatus 10 in the present example is just one example and other methods may be employed if radio frame information can be received from a radio frame acquisition apparatus 10. For example, it may be received by way of a portable storage apparatus. When a network is used, there is an advantage that interference can be detected in real time, and when a portable storage apparatus is used, there is an advantage that a network is not loaded or the present system can be operated even if the network is not available.

A radio frame information storage part 202 stores the radio frame information received by the radio frame information reception part 201. The radio frame information storage part 202, for example, stores (manages) radio frame information in a table (table information) as shown in FIG. 5.

With reference to FIG. 5, the radio frame information storage part 202 stores, as radio frame information, time at which a radio frame has been acquired, an identifier which uniquely identifies the radio frame acquisition apparatus 10 which has acquired the radio frame, an identifier which uniquely identifies a transmission source of the radio frame, and an identifier which uniquely identifies a destination of the radio frame in a state associated with each other. One row in a table corresponds to one radio frame information, and when a plurality of pieces of radio frame information are stored, a row is sequentially added thereto and stored.

With reference to an example of a table as shown in FIG. 5, the radio frame information of a first row indicates that a radio frame has been acquired at time of "1537412405001 milliseconds", by a radio frame acquisition apparatus 10-1, whose transmission source is a radio communication terminal 50-1 and whose destination is an access point 40-1. Please note that time and identifiers may be in other formats than those as shown in FIG. 5. For example, time may be a time stamp on the microsecond timescale or a format such as 2018/9/2016:26:30.151 or may be an arbitrary numerical value or a character string which represents the time. Furthermore, the identifier may be, for example, MAC (Media Access Control) address or IP (Internet Protocol) address, or may be one in other formats.

A simultaneous frame extraction part 203 extracts radio frame information observed simultaneously from radio frame information stored in the radio frame information storage part 202. Please note that the term simultaneous(ly) represents that acquired times of radio frames is within a predetermined time difference (within a time difference). In the present example, it will be described by assuming "within 1 millisecond", however, other value may be employed. In this way, radio frames of a predetermined time difference are extracted as simultaneous frames, it is possible to extract all of radio frames of practically simultaneous time(s) even when times (clocks) in a plurality of radio frame acquisition apparatuses 10 do not strictly coincide with each other.

An interference detection part 204 determines that the radio frames have interfered with each other on the basis of a plurality of pieces of radio frame information observed simultaneously searched by the simultaneous frame extraction part 203. Concretely, the interference detection part 204 determines whether or not a first radio frame and a second radio frame are interfering with each other on the basis of whether or not there exists(exist) a radio frame acquisition apparatus(es) 10 which has(have) demodulated the first radio frame and the second radio frame simultaneously or almost simultaneously (practically simultaneously demodulated), among a plurality of the radio frame acquisition apparatuses 10.

[Description of Operation]

Next, an operation of the first example embodiment of the present invention will be decried in detail with reference to drawings.

The first example embodiment of the present invention is made up by two operations.

Figure 6:
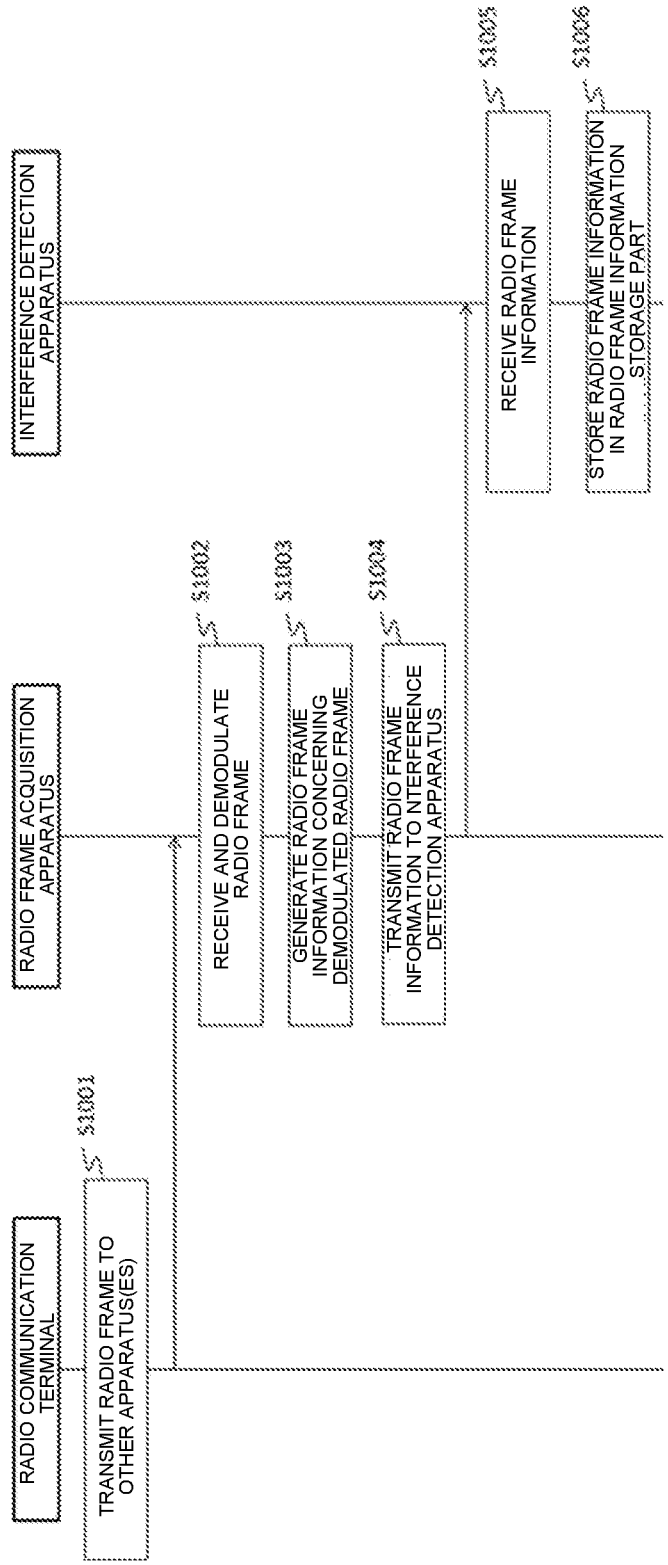
FIG. 6 is a sequence diagram illustrating an example of an operation of a system according to the first example embodiment.

A first operation is an operation as exemplified in FIG. 6, in which operation a radio frame acquisition apparatus 10 generates radio frame information and transmits it to an interference detection apparatus 20.

Figure 7:
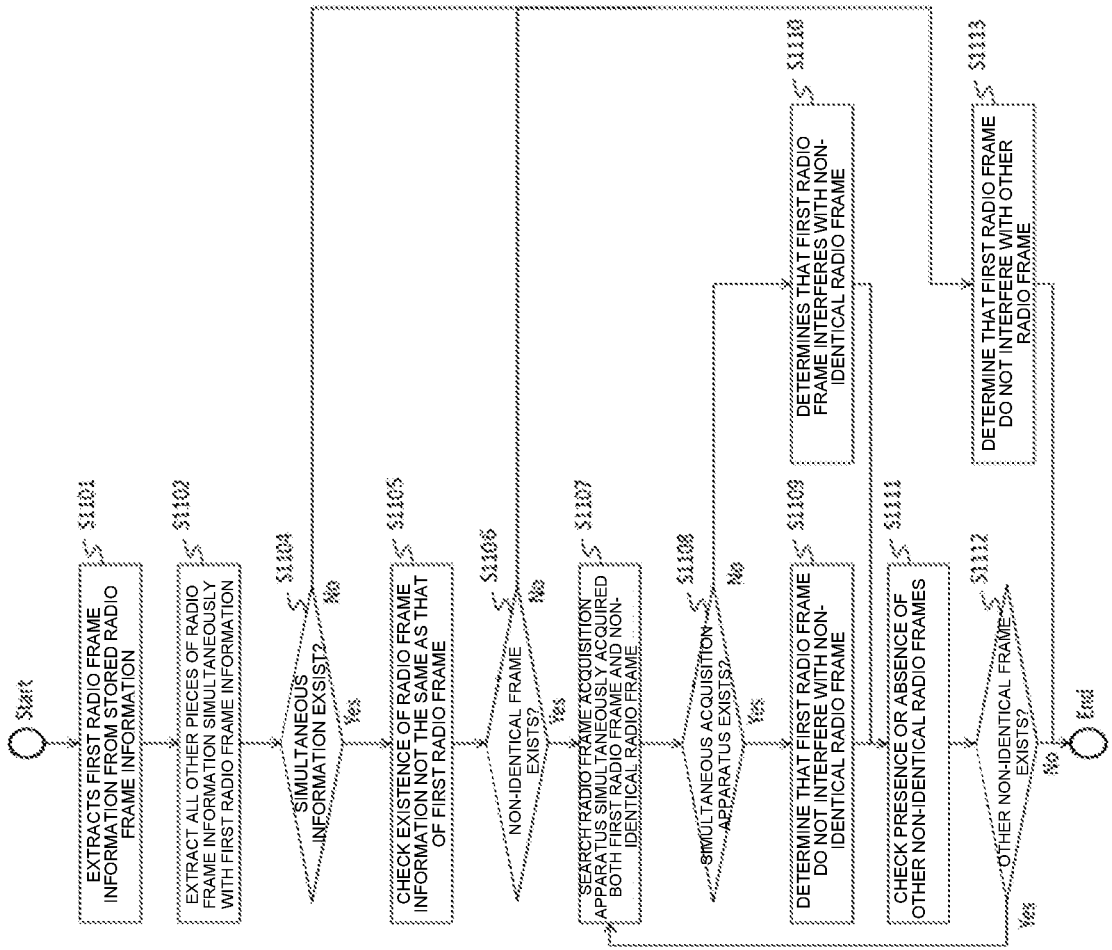
FIG. 7 is a flowchart illustrating an example of an operation of an interference detection apparatus according to the first example embodiment.

A second operation is an operation as exemplified in FIG. 7, in which operation an interference detection apparatus 20 determines whether or not a plurality if radio frames are interfering with each other.

First, with reference to FIG. 6, the first operation will be described.

First, a radio communication terminal 50 transmits a radio frame to other apparatus (step S1001). Please note that, in the present example, although an example in which a radio communication terminal 50-1 has transmitted a radio frame to an access point 40-1 will be described, a transmission source and a destination may be an arbitrary radio communication terminal 50 or an access point 40.

A transmitted radio frame propagates in the air as a radio wave (radio signal) and it is possible to be received by apparatuses other than an access point 40-1 of a destination. Here, a radio frame acquisition apparatus 10-1 receives a transmitted radio wave of a radio frame and demodulates it (step S1002).

Next, the radio frame acquisition apparatus 10-1 generates radio frame information with respect to a demodulated radio frame (step S1003). Here, as the radio frame information, a set of time "1537412405001" at which the radio frame has been demodulated, an identifier "10-1" of the radio frame acquisition apparatus 10 which has demodulated, an identifier "50-1" of a transmission source of the radio frame, and a destination "40-1" of the radio frame is generated.

Please note that radio frame information may include other information and, for example, may include any one of or all of radio field strength of a radio frame, a sequence number of a radio frame, and a data string itself of a radio frame.

Then, the radio frame acquisition apparatus 10-1 transmits the generated radio frame information to the interference detection apparatus 20 (step S1004). In FIG. 6, although an example is described, in which every time the radio frame acquisition apparatus 10-1 generates a piece of radio frame information, it transmits the radio frame information to the interference detection apparatus 20 through a network, other operation may be allowed. For example, in place of transmitting radio frame information every time the radio frame acquisition apparatus 10 generates a radio frame information, the radio frame acquisition apparatus 10 accumulates information with respect to radio frames demodulated during a predetermined amount of time and may transmit the information as a whole to the interference detection apparatus 20. Furthermore, radio frame information may be duplicated through a portable storage apparatus instead of through a network and passed to the interference detection apparatus 20.

The radio frame information reception part 201 of the interference detection apparatus 20 receives the transmitted radio frame information (step S1005).

The interference detection apparatus 20 stores the received radio frame information in the radio frame information storage part 202 (step S1006).

Next, with reference to FIG. 7, an operation in which the interference detection apparatus 20 detects interference between radio frames will be described. Please note that the interference detection apparatus 20 can start an interference detection operation of radio frames at arbitrary timing. For example, if a condition (for example, operation start time or a cycle) predetermined by an administrator is satisfied, the interference detection apparatus 20 may start the interference detection operation. Otherwise, the interference detection apparatus 20 may start the interference detection operation according to an explicit instruction of an administrator and so on or may start the interference detection operation when an amount of accumulated radio frame reaches a predetermined size, and so on.

First, the interference detection apparatus 20 extracts a first radio frame information (hereinafter, a radio frame indicated by the first radio frame information is described as a first radio frame) from radio frame information stored in the radio frame information storage part 202 (step S1101). Here, it is assumed that radio frame information in a first row of the example shown in FIG. 5 is extracted. Please note that an extraction method of the first radio frame information shown here is just an example and other method may be employed. For example, a method in which a user of the interference detection apparatus 20 refers to radio frame information using a display device and so on and selects may be employed.

Next, the simultaneous frame extraction part 203 of the interference detection apparatus 20 refers to the radio frame information storage part 202 and extracts all the other pieces of radio frame information simultaneously with the first radio frame information (step S1102).

In the present example, radio frame information whose acquisition time deviates less than or equal to 1 millisecond from the first radio frame information is(are) extracted as simultaneous radio frame information. With reference to the example of FIG. 5, the pieces of radio frame information from a second row to a 4-th row are extracted as pieces of simultaneous radio frame information.

If no simultaneous radio frame information is extracted (No in step S1104), the interference detection part 204 of the interference detection apparatus 20 determines that there is no other radio frame which interferes with a radio frame indicated by the first radio frame (step S1113).

If simultaneous radio frame information is extracted (Yes in step S1104), the simultaneous frame extraction part 203 checks existence of radio frame information which is not the same as that of the first radio frame in the extracted simultaneous radio frame information (step S1105). Please note that, here, the same denotes radio frames in which a transmission source, a destination and a sequence number in the radio frame information are the same, and acquired time and an acquisition apparatus of radio frame information thereof may be different from each other. For example, in the example as shown in FIG. 5, because a transmission source and a sequence number of a first radio frame information indicated in a first row do not coincide with those of radio frame information indicated in a second row and in a fourth row, it is determined that radio frame information which is not the same as described above exists.

If there does not exist radio frame which is not the same (non-identical radio frame) (No in step S1106), whereby it is indicated that no other radio frame interfering with the first frame exists, the interference detection part 204 determines that interference with respect to the first radio frame is not occurring (step S1113).

If there exists radio frame information with the respect to the non-identical radio frame (Yes in step S1106), the interference detection part 204 checks (searches) existence of a radio frame acquisition apparatus 10 which has acquired both the first radio frame and the non-identical radio frame (herein termed as "simultaneous acquisition apparatus") with reference to simultaneous radio frame information (step S1107).

If there exist(s) the radio frame acquisition apparatus(es) 10 which has/have simultaneously acquired the both of them (Yes in step S1108), the interference detection part 204 determines that the first radio frame and the non-identical radio frame do not interfere with each other (step S1109).

On the other hand, if there do(es) not exist the radio frame acquisition apparatus(es) 10 which has/have simultaneously acquired the both of them (No in step S1108), the interference detection part 204 determines that the first radio frame and the non-identical radio frame interfere with each other (step S1110). In the example as shown in FIG. 5, because there is no radio frame acquisition apparatus 10 which has simultaneously acquired both the first radio frame information indicated in a first row and non-identical radio frame information indicated in the second row and in the fourth row, it is determined that interference between the radio frames is occurring.

Then, the interference detection part 204 performs checking processing of presence or absence with respect to other non-identical radio frames (step S1111, S1112) and repeats processings described above as necessary.

As described above, by checking existence of the radio frame acquisition apparatus 10 which has acquired both the first radio frame and the non-identical radio frame, it becomes possible to accurately determine interference.

Although it may be sufficient to check that those radio frames are being transmitted simultaneously in order to determine that the radio frames transmitted from different transmission sources are interfering with each other, it is difficult to determine that they are being transmitted simultaneously because a time precision of less than or equal to 1 millisecond is necessary. The fact that there exists a radio frame acquisition apparatus 10 which has simultaneously or almost simultaneously demodulated two radio frames observed at close times shows that the times at which two frames were transmitted do not overlap and the two radio frames do not interfere with each other. Therefore, by searching a radio frame acquisition apparatus 10 which has demodulated simultaneously or almost simultaneously, the interference detection apparatus 20 can accurately determine whether or not two frames have interfered with each other.

Please note that an interference detection part 204 may determine presence or absence of interference by further using radio field strength of the acquired radio frame by each radio frame acquisition apparatus 10. Concretely, an interference detection apparatus 20 is configured so as to store an index indicating received radio field strength (for example, RSSI (Received Signal Strength Indication) and so on) of each radio frame at a radio frame acquisition apparatus 10, into radio frame information to be stored in a radio frame information storage part 202.

The interference detection part 204 calculates, in advance, an average value of the Received Signal Strength Indications at each radio frame acquisition apparatus 10 with respect to radio frames to be transmitted from each radio communication terminal 50 with reference to the radio frame information storage part 202. When the interference detection part 204 searches a simultaneous acquisition apparatus in step S1107, if, for example, there is no radio frame acquisition apparatus 10 in which an average value of the Received Signal Strength Indications of a radio frame to be transmitted from a radio communication terminal 50-1 and an average value of the Received Signal Strength Indications of a radio frame to be transmitted from a radio communication terminal 50-2 are comparable (a difference between two average values is within a predetermined range) and there exists no simultaneous acquisition apparatus, the interference detection part 204 suspends determination of whether or not the radio frames transmitted from the radio communication terminal 50-1 and the radio communication terminal 50-2 interfere with each other.

For example, it is assumed when, in FIG. 2, an unillustrated radio frame acquisition apparatus 10-3 can successfully receive a radio wave from the radio communication terminal 50-1 but can hardly receive a radio wave from the radio communication terminal 50-2. In this case, an average value of the Received Signal Strength Indications with respect to the radio communication terminal 50-1 and an average value of the Received Signal Strength Indications with respect to the radio communication terminal 50-2 at the radio frame acquisition apparatus 10-3 greatly differ. Furthermore, because the radio frame acquisition apparatus 10-3 can or cannot receive a radio wave from the radio communication terminal 50-2, it may be or may not be determined to be a "simultaneous acquisition apparatus" depending on timing. In this case, it may be determined that interference between radio frames is occurring because it is not determined that the radio frame acquisition apparatus 10-3 is a "simultaneous acquisition apparatus" (No in step S1108 as shown in FIG. 7), unless presence or absence of interference of the radio frame is determined by considering radio field strength as described above. However, because the radio frame acquisition apparatus 10-3 can hardly receive a radio wave from the radio communication terminal 50-2, interference between radio frames do not practically occur. Therefore, by considering the Received Signal Strength Indications from each radio communication terminal 50 for interference determination, it is possible to prevent the interference detection apparatus 20 from erroneously determining that the radio frames which do not actually interfere with each other be interfering with each other. Please note that the interference detection part 204 may perform interference determination using mode values and median values of the Received Signal Strength Indications in place of the average value of the Received Signal Strength Indications as described above.

Alternative to the radio field strength, the interference detection part 204 may use a demodulation rate of radio frames at each radio frame acquisition apparatus 10 under a condition (under an environment) that interference is not occurring. The demodulation rate of radio frames where interference is not occurring can be calculated, under a condition that there exists no non-identical radio frame, as a ratio between a total number of radio frames transmitted from the radio communication terminal 50 and a number of radio frames demodulated at the radio frame acquisition apparatus 10 among radio frames transmitted from the radio communication terminal 50.

The total number of radio frames transmitted from the radio communication terminal 50 under a condition that there exists no non-identical radio frame can be calculated as the number of demodulated radio frames at the radio frame acquisition apparatus 10 at which the Received Signal Strength Indication from the radio communication terminal 50 is sufficiently strong. For example, because a radio frame acquisition apparatus 10 whose received radio wave from a radio communication terminal 50 is greater than or equal to 30 decibel milliwatts (30 dBm) can demodulate almost all the radio frames transmitted from the radio communication terminal 50, it is possible to calculate the total number of the radio frames.

Please note that a method of calculating the number of radio frames shown here is just one example, and for example, the total number of radio frames may be calculated by using sequence numbers of radio frames.

If there is no radio frame acquisition apparatus 10 which satisfies that both a demodulation rate of radio frames transmitted from the radio communication terminal 50-1 and a demodulation rate of radio frames transmitted from the radio communication terminal 50-2 are greater than or equal to a predetermined value and there is no simultaneous acquisition apparatus, the interference detection part 204 suspends determination of whether or not the radio frames transmitted from the radio communication terminal 50-1 and the radio communication terminal 50-2 interfere with each other.

The predetermined value is set, for example, to be 80%, but other values may be employed. By doing this, it is possible to prevent the interference detection apparatus 20 from erroneously determining that the radio frames which do not actually interfere with each other are interfering with each other. That is, by considering the demodulation ratio of radio frames in interference determination of radio frames, it is possible to prevent the interference detection apparatus 20 from erroneously determining with respect to presence or absence of interference of radio frames in the same way as the case with considering the Received Signal Strength Indications in interference determination.

Furthermore, an interference detection part 204, in place of searching a simultaneous acquisition apparatus, may determine presence or absence of interference on the basis of the number of radio frame acquisition apparatuses 10 which have demodulated identical radio frames. Concretely, the interference detection part 204 calculates, in advance, the number of the radio frame acquisition apparatuses 10 which have demodulated the first radio frames in a case where there exists no non-identical radio frame (that is, no other radio frame is observed simultaneously with the first radio frame) beforehand. At this time, an average value of the number of the acquired first radio frames may be calculated or variance or standard deviation may be included.

Then, if non-identical radio frame(s) observed simultaneously as the first frame exist(s), the interference detection part 204 calculates the number of the radio frame acquisition apparatuses 10 which have demodulated the first radio frames.

When the calculated number of the radio frame acquisition apparatuses is lower than a pre-calculated average value of the number of the radio frame acquisition apparatuses in a case where there exists no non-identical frame, the interference detection part 204 determines that the first radio frame and the non-identical frame interfere with each other.

On the other hand, when the number of the radio frame acquisition apparatuses is equal to the pre-calculated average value of the number of the radio frame acquisition apparatuses in a case where there exists no non-identical frame, it is determined that the first radio frame and the non-identical frame do not interfere with each other.

In this way, the interference detection apparatus 20 determines interference on the basis of the number of the radio frame acquisition apparatuses 10 which have demodulated radio frames. As a result, it is possible to determine presence or absence of interference even if there exists no radio frame acquisition apparatus 10 which receives a radio frame transmitted from the first radio communication terminal and a radio frame transmitted from the second radio communication terminal with the comparable Received Signal Strength Indications (i.e., at a similar level thereof).

Please note that, although, in the present example, an average value of the number of the radio frame acquisition apparatuses in a case where there exists no non-identical frame and the number of the radio frame acquisition apparatuses in a case where there exists a non-identical frame(s) are compared, other values can be used. For example, if the number of the radio frame acquisition apparatus(es) in a case where there exists a non-identical radio frame(s) is less than a value obtained by subtracting a standard deviation from an average value of the number of the radio frame acquisition apparatuses in a case where there exists no non-identical radio frame, it may be determined that interference is occurring.

The interference detection part 204 may further determine interference on the basis of whether or not a radio frame is re-transmitted. When there is no radio frame acquisition apparatus 10 which simultaneously acquired the first radio frame and a non-identical radio frame observed simultaneously, the interference detection part 204 determines whether or not the first frame has been retransmitted. For example, the interference detection part 204 checks whether or not there exists a radio frame which has the same transmission source, a destination, and the same sequence number as those of the first radio frame after the first radio frame. If it exists, it is determined that the first radio frame has been re-transmitted, and if it does not exist, it is determined that the first radio frame has not been re-transmitted. Please note that a method of determining re-transmission is just one example, and for example, a re-transmission flag of a radio frame may be referred to and so on. When the first radio frame has been re-transmitted, the interference detection part 204 determines that the first radio frame and the non-identical frame have interfered with each other, and when not re-transmitted, determines that they have not interfered. Because the fact that the radio frame is not re-transmitted denotes that the radio frame has reached the radio communication terminal to be a destination without interference, it is possible to determine presence or absence of the interference more accurately by considering presence or absence of the re-transmission.

[Description of Effect]

According to the first example embodiment of the present invention, the presence or absence of the interference with respect to the radio frames is detected using the radio frame acquisition apparatus(es) 10 which acquires the radio frame information and the interference detection apparatus 20. According to the first example embodiment of the present invention, it is possible to detect interference without requiring information which can only be acquired by a radio communication terminal 50 and an access point 40, such as response time until an ACK frame of a radio frame is received, and the Received Signal Strength Indication of a radio frame observed at a radio communication terminal. That is, it is possible to detect radio wave interference without modifying an existing radio communication terminal 50 and an access point 40 which do not have an interference detection function.

Furthermore, according to the first example embodiment of the present invention, it is determined that whether or not two radio frames which have simultaneously transmitted interfere with each other according to a state of whether or not demodulation is possible at a plurality of radio frame acquisition apparatuses 10. Therefore, it is not necessary that times (clocks) in a plurality of radio frame acquisition apparatuses 10 strictly synchronized with each other and it becomes possible to determine interference even if there is a certain degree of synchronization error.

Second Example Embodiment

Next, a second example embodiment of the present invention will be described in detail with reference to drawings.

[Description of Configuration]

Figure 8:
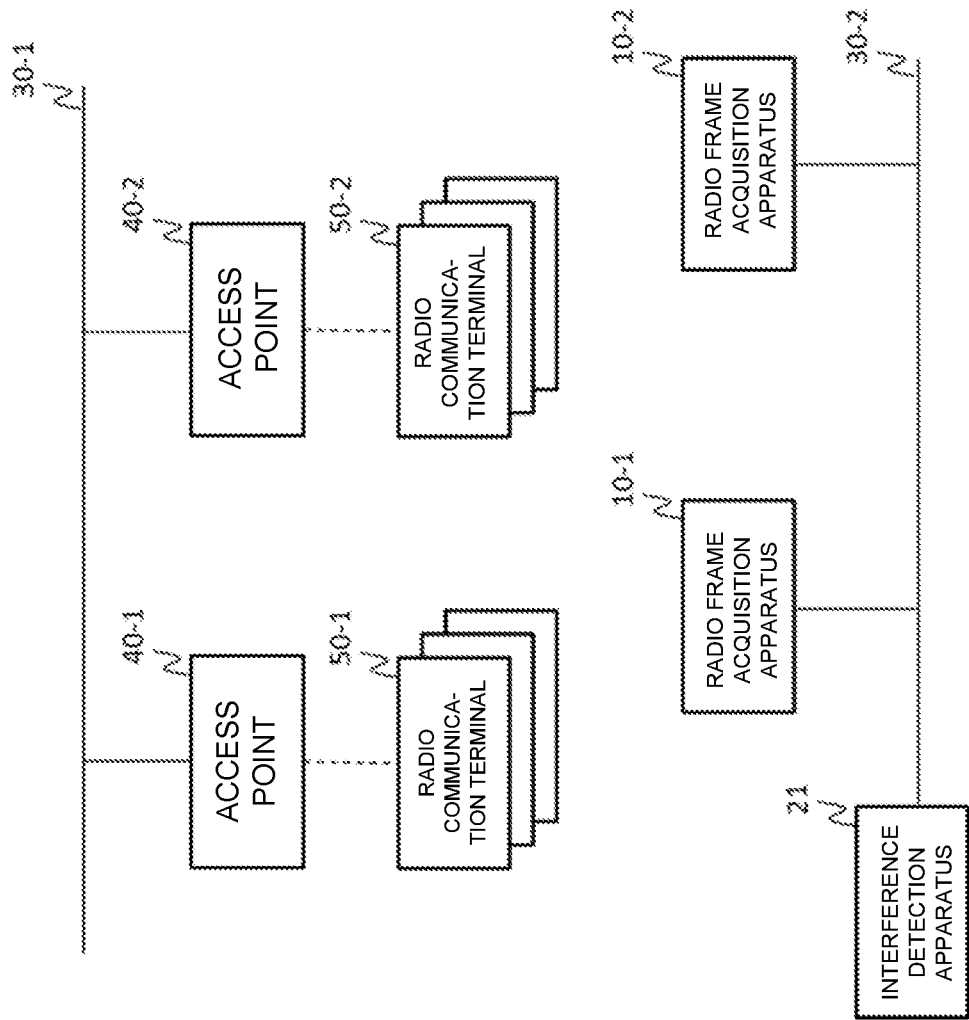
FIG. 8 is a block diagram illustrating an example of a configuration of an interference detection apparatus according to a second example embodiment.

FIG. 8 is an example of a configuration of an interference detection system according to the second example embodiment of the present invention. With reference to FIG. 8, the interference detection system according to the second example embodiment of the present invention is made up by radio frame acquisition apparatuses 10, an interference detection apparatus 21, networks 30, access points 40, and radio communication terminals 50.

The interference detection system according to the second example embodiment of the present invention is different from the interference detection system according to the first example embodiment of the present invention in that the interference detection apparatus 20 is replaced with the interference detection apparatus 21. Please note that the same reference signs are assigned to the components common to the first example embodiment of the present invention and detailed description thereof will be omitted.

The interference detection apparatus 21 determines whether or not a radio frame of a first radio communication terminal 50-1 and a radio frame of a second radio communication terminal 50-2 demodulated by a radio frame acquisition apparatus 10 interfere with each other. Furthermore, the interference detection apparatus 21 determines, on the basis of the determination result, whether the first and the second radio communication terminals 50 are in a relationship of hidden terminals or in a relationship of exposed terminals. Please note that "hidden terminals" indicate two or more radio communication terminals 50 each of which is located outside a reachable range of each other's radio wave. In contrast, "exposed terminals" indicate two or more radio communication terminals 50 each of which is located within a reachable range of each other's radio wave.

Figure 9:
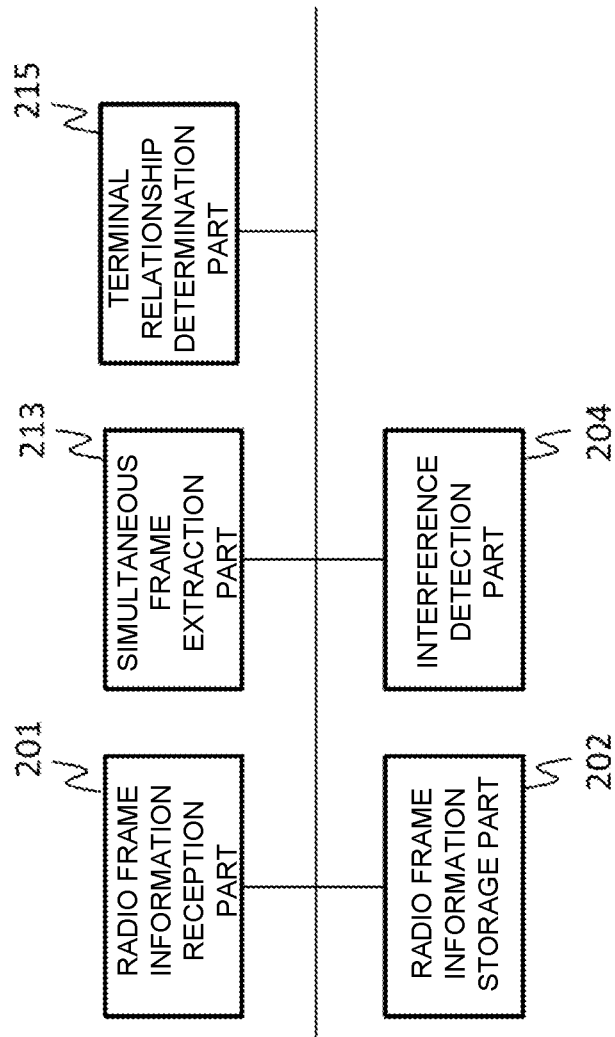
FIG. 9 is a block diagram illustrating an example of a configuration of an interference detection apparatus according to the second example embodiment.

FIG. 9 is a diagram illustrating an example of a configuration of an interference detection apparatus 21 according to the second example embodiment of the present invention. According to FIG. 9, the interference detection apparatus 21 is made up by a radio frame information reception part 201, a radio frame information storage part 202, a simultaneous frame extraction part 213, an interference detection part 204, and a terminal relationship determination part 215. The interference detection apparatus 21 according to the second example embodiment of the present invention is different from the interference detection apparatus 20 according to the first example embodiment of the present invention in that the simultaneous frame extraction part 203 is replaced with the simultaneous frame extraction part 213 and in that the terminal relationship determination part 215 is provided. Please note that the same reference signs are assigned to components common to the first example embodiment of the present invention and the description thereof will be omitted.

The simultaneous frame extraction part 213 searches in the radio frame information storage part 202 and extracts radio frame information with respect to radio frames observed simultaneously (practically simultaneously). The simultaneous frame extraction part 213 is different from the simultaneous frame extraction part 203 in that it searches in the radio frame information storage part 202 only for radio frames with respect to the first radio communication terminal 50-1 and the second radio communication terminal 50-2 to be focused.

The terminal relationship determination part 215 determines, on the basis of an interference determination result of radio frames by the interference detection part 204, whether the first and the second radio communication terminals 50 are in a relationship of hidden terminals or in a relationship of exposed terminals.

[Description of Operation]

Next, an operation of the second example embodiment of the present invention will be decried.

The second example embodiment of the present invention is made up by two operations.

A first operation is an operation in which the radio frame acquisition apparatus 10 generates radio frame information and transmits it to an interference detection apparatus 21, and the detailed description thereof will be omitted since it is the same operation as that of the first example embodiment of the present invention.

Figure 10:
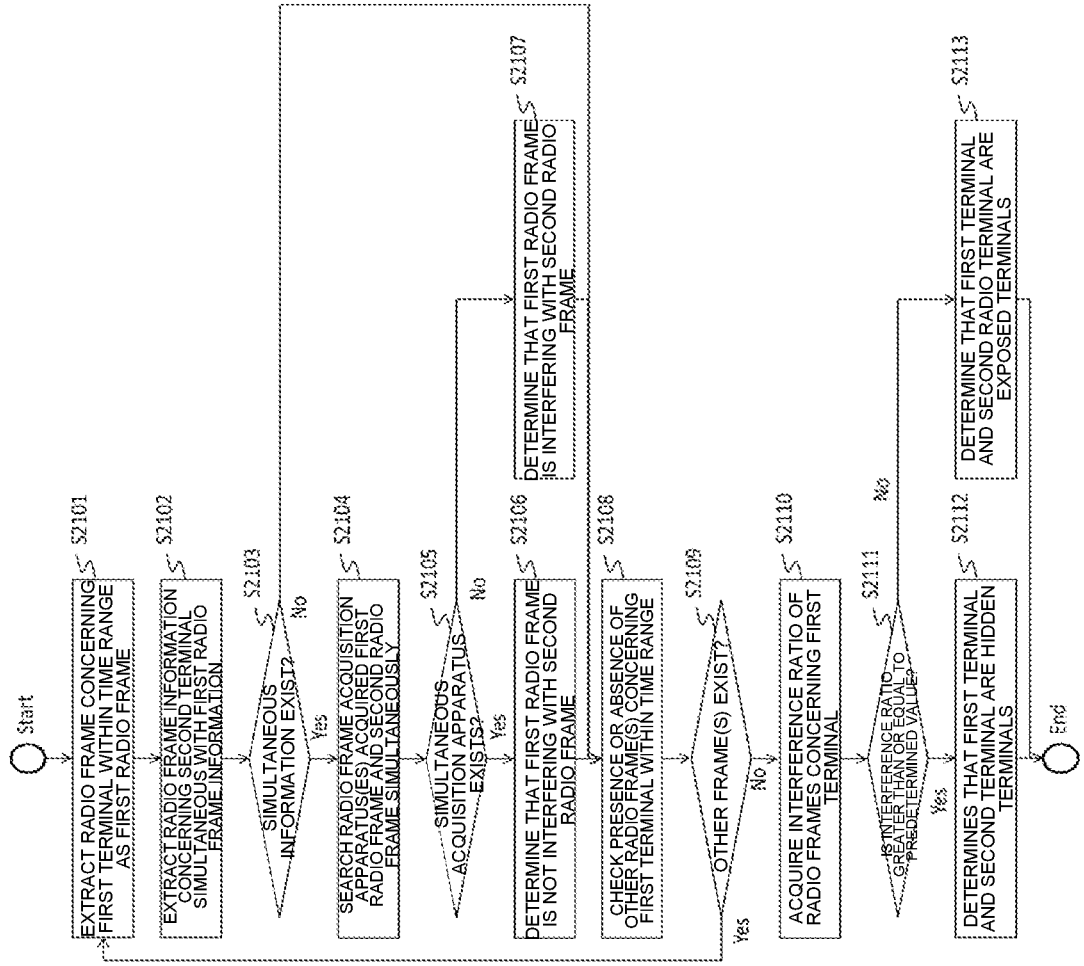
FIG. 10 is a flowchart illustrating an example of an operation of an interference detection apparatus according to the second example embodiment.

A second operation is an operation as shown in FIG. 10, in which the interference detection apparatus 21 determines whether or not a radio frame of the first radio communication terminal 50-1 and a radio frame of the second radio communication terminal 50-2 are interfering with each other. Furthermore, the second operation is an operation to determine whether the first radio communication terminal 50-1 and the second radio communication terminal 50-2 are hidden terminals or exposed terminals. The above operation will be described in detail using FIG. 10 below.

First, a simultaneous frame extraction part 213 of the interference detection apparatus 21 extracts radio frame information whose transmission source is the first radio communication terminal 50-1 as a first radio frame with reference to the radio frame information storage part 202 (step S2101).

Please note that, in step S2101, radio frames having time of radio frame information within a predetermined range (hereinafter, denoted by determination time range) are only extracted. For example, in the present example, radio frame information from time "1537412405001" to "1537412465001", that is, for 60 seconds are extracted. Pease note that the range as shown here is just an example and an arbitrary range may be employed.

For example, when information stored in the radio frame information storage part 202 is that as shown in FIG. 5, in step S2102, radio frame information of a first row in FIG. 5 is extracted.

Next, the simultaneous frame extraction part 213, with reference to the radio frame information storage part 202, extracts a second radio frame simultaneous with the extracted first radio frame, whose transmission source is a second radio communication terminal 50-2 (step S2102). In the present example, radio frame information whose acquired time does not exceed 1 millisecond from that of the first radio frame information is extracted as a simultaneous radio frame. With reference to the example as shown in FIG. 5, radio frame information in a second row is extracted as a second radio frame. Please note that although, in the present example, a difference in the acquired time is less than or equal to 1 millisecond, it is just an example and other arbitrary value may be employed.

If the second radio frame information is not extracted (No in step S2103), processing on and after step S2108 will be performed as described later.

If the second radio frame information is extracted (Yes in step S2103), the simultaneous frame extraction part 213, with reference to the radio frame information storage part 202, determines whether or not there exists(exist) a radio frame acquisition apparatus(es) 10 which has(have) demodulated the first radio frame and the second radio frame simultaneously or almost simultaneously (step S2104).

According to the example as shown in FIG. 5, with reference to the third row and the fourth row, because the radio frame acquisition apparatus 10-3 has demodulated the first radio frame and the second radio frame simultaneously or almost simultaneously, the simultaneous frame extraction part 213 determines that there is a radio frame acquisition apparatus 10 which has demodulated the first radio frame and the second radio frame simultaneously or almost simultaneously (hereinafter referred to as "simultaneous acquisition apparatus").

If there exists a simultaneous acquisition apparatus (Yes in step S2105), the interference detection part 204 determines that the first radio frame and the second radio frame are not interfering (step S2106).

On the other hand, if there exists no simultaneous acquisition apparatus (No in step S2105), the interference detection part 204 determines that the first radio frame and the second radio frame are interfering with each other (step S2107).

Then, the simultaneous frame extraction part 213 of the interference detection apparatus 21 checks whether there exists other radio frame information in which the radio communication terminal 50-1 is the transmission source and time is within a determination time range (for example, 60 seconds) (step S2108). For example, in the example as shown in FIG. 5, radio frame information in the third row and radio frame information in the fourth row are extracted.

If there exists(exist) other radio frame(s) (Yes in step S2109), processings on and after step S2101 are performed for other radio frame(s) and presence or absence of interference is determined.

If there exists no other radio frame (No in step S2109), because determination with respect to presence or absence of interference between the first radio frame and the second radio frame within the above determination time range becomes to be completed, the terminal relationship determination part 215 performs processings on and after step S2110. The terminal relationship determination part 215 calculates (acquires) an interference ratio which is a ratio of radio frames whose transmit source is the first radio communication terminal 50-1 having interfered with radio frames whose transmit source is the second radio communication terminal 50-2, within a determination time range (step S2110).

The interference ratio is calculated by a ratio of the total number of the first frames determined to be interfering in step S2107 relative to the total number of the first radio frames extracted at step S2101 and later determined to be Yes in step S2103.

If the calculated interference ratio is greater than or equal to a predetermined value (hereinafter denoted as an interference threshold value) (Yes in step S2111), the terminal relationship determination part 215 determines that the first radio communication terminal 50-1 and the second radio communication terminal 50-2 are hidden terminals (step S2112).

On the other hand, if the calculated interference ratio is smaller than a predetermined value (No in step S2111, the terminal relationship determination part 215 determines that the first radio communication terminal 50-1 and the second radio communication terminal 50-2 are exposed terminals (step S2113). Please note that the interference threshold value is a value within a range from 0 to 1 and 0.2 is used as an example.

[Description of Effect]

According to the second example embodiment of the present invention, on the basis of radio frame information acquired by the radio frame acquisition apparatus 10, it becomes possible to determine a relationship between terminals as to radio wave interference which indicates whether the first radio communication terminal 50-1 and the second radio communication terminal 50-2 are hidden terminals or exposed terminals. That is, it becomes possible to determine a relationship between terminals as to radio wave interference of two radio communication terminals (access points) without modifying existing radio communication terminals 50 and access points 40 which do not have an interference detection function. As a result, it is possible to improve communication quality of the radio communication terminals 50 by taking a way of coping according to the relationship of the radio communication terminals 50. For example, if it is determined that two radio communication terminals 50 are hidden terminals, it is possible to resolve the hidden terminal and suppress degradation of communication quality due to a hidden terminal problem by bringing positions of them closer to each other.

Third Example Embodiment

Next, a third example embodiment of the present invention will be described in detail with reference drawings.

[Description of Configuration]

Figure 11:
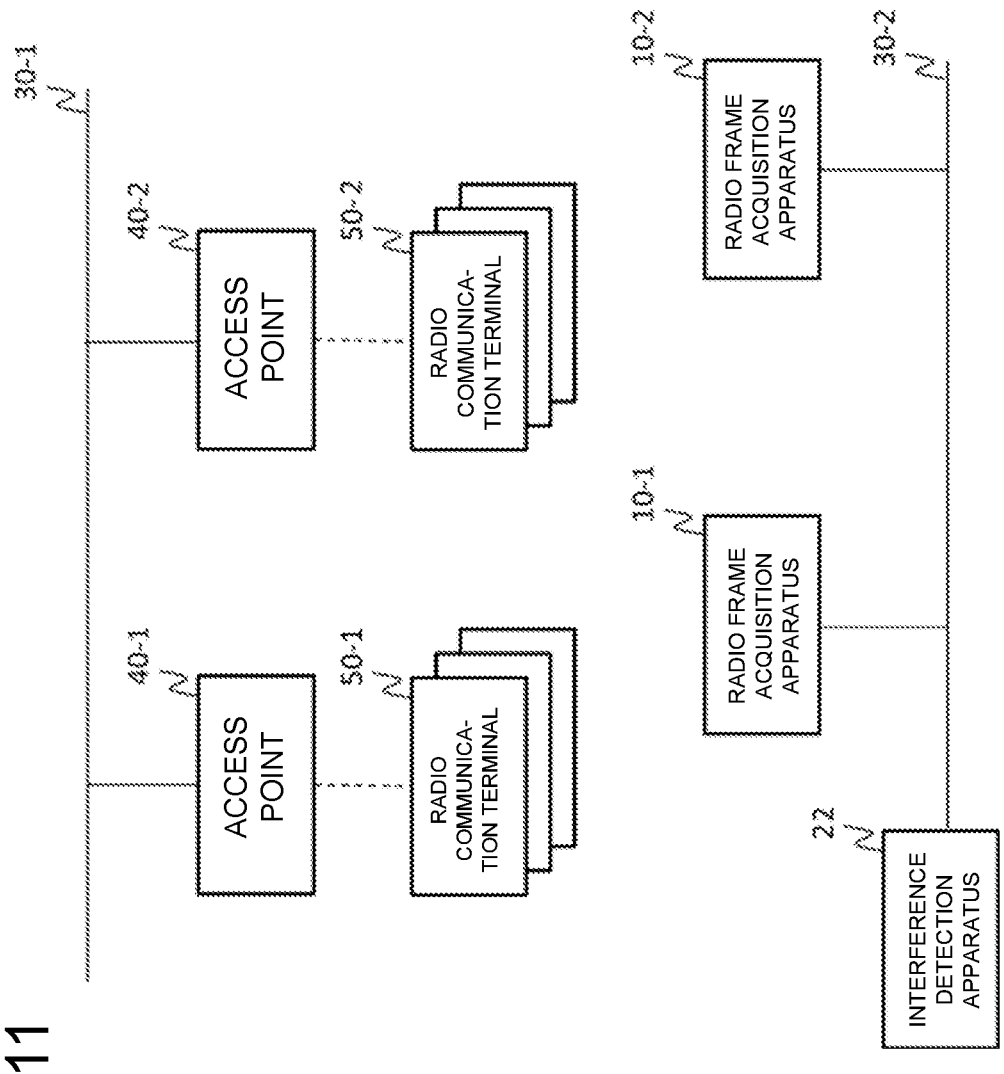
FIG. 11 is a block diagram illustrating an example of a configuration of a system according to a third example embodiment.

FIG. 11 is an example of a configuration of an interference detection system according to a third example embodiment of the present invention. With reference to FIG. 11, the interference detection system according to the third example embodiment of the present invention is made up by radio frame acquisition apparatuses 10, an interference detection apparatus 22, networks 30, access points 40 and radio communication terminals 50.

The interference detection system according to the third example embodiment of the present invention is different from the interference detection system according to the second example embodiment of the present invention in that the interference detection apparatus 21 is replaced with the interference detection apparatus 22. Please note that the same reference signs are assigned to the components common to the first or second example embodiment of the present invention and detailed description thereof will be omitted.

The interference detection apparatus 22 determines an interference relationship between a first position and a second position (hereinafter denoted as an "inter-position interference relationship"). Here, the inter-position interference relationship represents whether or not a radio wave emitted from the radio communication terminal 50-1 located at a first position reaches a radio communication terminal 50-2 located at a second position with sufficient strength of a radio wave. Hereinafter, if a radio wave reaches with sufficient strength, it is denoted that two points are in a reachable relationship, and if a radio wave does not reach, it is denoted that two points are in a non-reachable relationship.

Here, the sufficient strength may be, for example, radio field strength capable of carrier sense in CSMA/CA (Carrier Sense Multiple Access/Collision Avoidance) or strength higher than thermal noise by a predetermined value or more. Please note that if the inter-position interference relationship between the first position and the second position is in a reachable relationship, the radio communication terminal 50-1 located at the first position and the radio communication terminal 50-2 located at the second position are in a relationship of exposed terminals, and if it is in a non-reachable relationship, the radio communication terminals 50-1 and 50-2 are in a relationship of hidden terminals.

Figure 12:
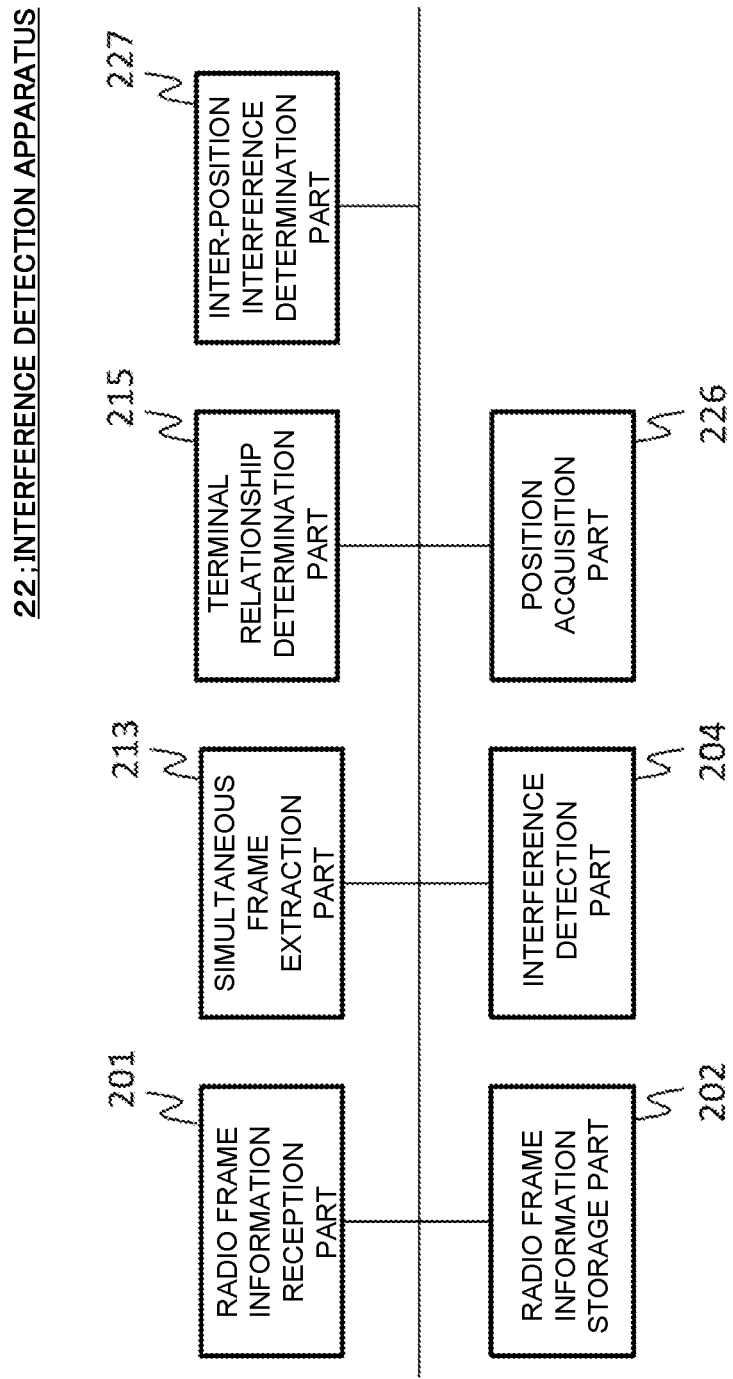
FIG. 12 is a block diagram illustrating an example of a configuration of interference detection apparatus according to the third example embodiment.

FIG. 12 is a diagram illustrating an example of a configuration of the interference detection apparatus 22 according to the third example embodiment of the present invention. According to FIG. 12, the interference detection apparatus 22 is made up by a radio frame information reception part 201, a radio frame information storage part 202, a simultaneous frame extraction part 213, an interference detection part 204, a terminal relationship determination part 215, a position acquisition part 226, and an inter-position interference determination part 227.

The interference detection apparatus 22 according to the third example embodiment of the present invention is different from the interference detection apparatus 21 according to the second example embodiment of the present invention in that a position acquisition part 226 and an inter-position interference determination part 227 are provided. Please note that the same reference signs are assigned to the components common to the first and second example embodiments of the present invention and detailed description thereof will be omitted.

The position acquisition part 226 acquires positions of the access points 40 and the radio communication terminals 50. The position acquisition part 226, for example, on the basis of strength of a radio wave emitted from the radio communication terminal 50 observed by a plurality of radio frame acquisition apparatuses 10, may acquire positions of the access points 40 and the radio communication terminals 50 using three-point positioning (trilateration). Please note that it is assumed that positions of the radio frame acquisition apparatuses 10 are input to the position acquisition part 226 beforehand. Please note that an acquisition method of a position as described in the present example is just an example and other method may be employed as long as positions of the access points 40 and the radio communication terminal 50 can be acquired. For example, a method may be employed, in which own position information acquired using GPS (Global Positioning System) and so on by the radio communication terminal 50 is notified to the position acquisition part 226.

The inter-position interference determination part 227 determines the inter-position interference relationship on the basis of a determination result by the terminal relationship determination part 215 and a position of the radio communication terminal 50 acquired from the position acquisition part 226.

[Description of Operation]

Figure 13:
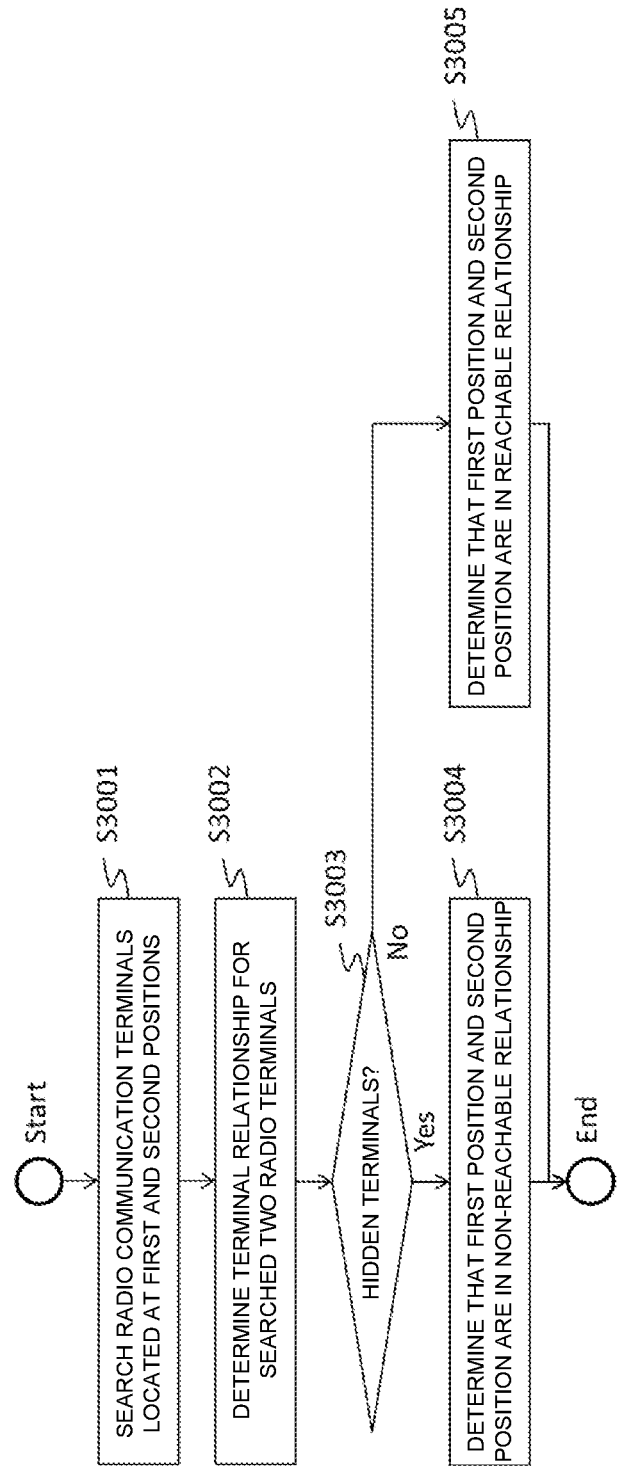
FIG. 13 is a flowchart illustrating an example of an operation of an interference detection apparatus according to the third example embodiment.

Next, an example of an operation of the third example embodiment of the present invention will be described with reference to FIG. 13. FIG. 13 illustrates an example of an operation of an interference detection apparatus 22.

In the present operation example, it is assumed that a first position is a position indicated by a coordinate (10, 11) and a second position is a position indicated by a coordinate (21, 10), and an operation to determine by the interference detection apparatus 22 with respect to an interference relationship of the first and second positions will be described. Please note that a unit of a distance in a coordinate system including the above two coordinates can be arbitrary. For example, a unit of a coordinate system can be set to be arbitrary, such as a meter or a kilometer and so on according to scale of the system or a use and so on.

First, the inter-position interference determination part 227 of the interference detection apparatus 22 acquires position information of radio communication terminals 50 from the position acquisition part 226 and searches the radio communication terminals 50 located at the first position and the second position (step S3001). Concretely, the inter-position interference determination part 227, with reference to the radio frame information storage part 202, extracts all the identifiers of the radio communication terminals 50 included in the stored radio frame information.

Then, the position acquisition part 226 acquires positions of the radio communication terminals 50 corresponding to the extracted identifiers. For example, if a position of the radio communication terminal 50-1 is (10, 11) and a position of the radio communication terminal 50-2 is (21, 10), the radio communication terminal 50-1 and 50-2 are extracted at step S3001.

Then, with respect to the extracted two terminals, the terminal relationship determination part 215 determines whether they are in a relationship of hidden terminals or in a relationship of exposed terminals (step S3002). Please note that because the detailed operation in step S3002 is the same as that of the second example embodiment of the present invention, the detailed description thereof will be omitted.

If the extracted two terminals are determined to be hidden terminals (Yes in step S3003), the terminal relationship determination part 215 determines that the first position and the second position are in a non-reachable relationship (step S3004). On the other hand, if the extracted two terminals are determined to be exposed terminals (No in step S3003), the terminal relationship determination part 215 determines that the first position and the second position are in a reachable relationship (step S3005).

Please note that, in step S3001, if radio communication terminal 50 located at the first position or the second position is unable to be extracted, it is not possible to determine the inter-position interference relationship between the first position and the second position, in such case, the interference detection apparatus 22 may repeatedly perform processings as shown in FIG. 13 while taking a way of coping such as changing positions to be determined and so on.

Because there also exist radio communication terminals 50 which move, it is possible to calculate an inter-position interference relationship when the radio communication terminals 50 move and reach the first or the second position. Thereby, it is possible to exhaustively calculate inter-position interference relationships at various positions.

Furthermore, when searching the radio communication terminal 50 at the first position or the second position in step S3001, a radio communication terminal 50 located within a predetermined distance from the first position or the second position may be used. For example, let the predetermined distance be "1", if a radio communication terminal 50-3 may be located at (11, 11), the inter-position interference determination part 227 may extract the radio communication terminal 50-3 as a terminal at the first position because a distance from the first portion (10, 11) is "1". By doing this, it becomes possible to determine an inter-position interference relationship even if there exists no radio communication terminal at a position which strictly coincides with a designated position.

[Description of Effect]

According to the third example embodiment of the present invention, on the basis of the radio frame information acquired by the radio frame acquisition apparatus 10, it is possible to determine whether or not a radio wave transmitted from the radio communication terminal 50 located at a first position reaches the radio communication terminal 50 located at a second position with sufficient strength. Thereby, for example, by preventing the radio communication terminals 50 from being arranged at the first position and the second position determined that a radio wave does not reach with sufficient strength, it becomes possible to prevent degradation of communication quality due to hidden terminals.

According to the present invention, it can be applied to a use to identify whether communication quality degradation factor of a plurality of radio communication terminals 50 is caused by radio wave interference between radio communication terminals. Furthermore, it can be applied to a use to visualize radio wave interference status of a plurality of radio communication terminals.

[Hardware Configuration]

Next, a hardware configuration of each apparatus which makes up a system will be described.

Figure 14:
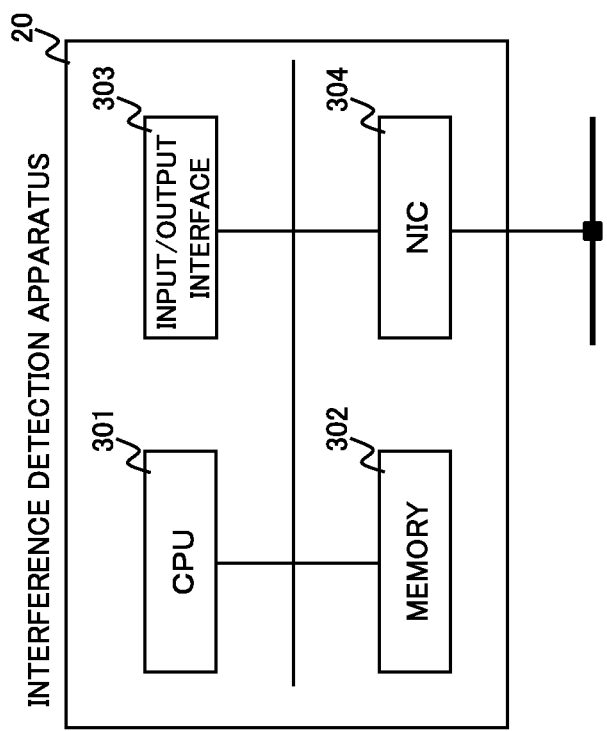
FIG. 14 is a diagram illustrating an example of a hardware configuration of an interference detection apparatus.

FIG. 14 is a diagram illustrating an example of a hardware configuration of an interference detection apparatus 20 (or 21, 22). The interference detection apparatus 20 includes a configuration as exemplified in FIG. 14. For example, the interference detection apparatus 20 includes a CPU (Central Processing Unit) 301, a memory 302, an input/output interface 303, and an NIC (Network Interface Card) 304 which is a communication module, and so on. Please note that the configuration as shown in FIG. 14 does not intend to limit a hardware configuration of the interference detection apparatus 20. The interference detection apparatus 20 may include any hardware which is not illustrated in drawing. The number of CPUs and so on included in the interference detection apparatus 20 also does not intend to be limit to an example as shown in FIG. 14 and, for example, a plurality of CPU 301 may be included in the interference detection apparatus 20.

The memory 302 is a RAM (Random Access Memory), a ROM (Read Only Memory), an auxiliary storage device (a hard disk and so on), and so on.

The input/output interface 303 is an interface of an input/output device which is not illustrated in drawings. The input/output device includes, for example, a display device, an operation device and so on. The display device is, for example, a liquid crystal display and so on. The operation device is, for example, a keyboard, a mouse and so on.

A function of the interference detection apparatus 20 is realized by the processing module as described above. The processing module, for example, is realized by executing a program stored in the memory 302 by the CPU 301. Furthermore, the program can be downloaded through a network or updated using a storage medium on which the program is stored. Furthermore, the processing module described above may be realized by a semiconductor chip. That is, a function performed by the processing module described above may be realized by any hardware, or by a software executed by using a hardware.

Please note that since the radio frame acquisition apparatus 10 can be realized by a radio wave reception function and an information processing function which a normal access point has, the detailed description thereof will be omitted. Furthermore, since a hardware configuration of an access point 40 and a radio communication terminal 50 is known to those skilled in the art, the detailed description thereof will be omitted.

[Variations]

Configuration, operations and so on of the interference detection system described in the first to the third example embodiments are examples and not intended to limit a system configuration and so on. For example, a database server which stores radio frame information may be installed in place of the radio frame information storage part 202 of the interference detection apparatus 20.

It is possible to have a computer function as an interference detection apparatus by installing a computer program (an interference detection program) as described above in a storage part of the computer. Furthermore, by causing the computer to execute the computer program as described above, it is possible to perform an interference detection method which determines whether or not interference is occurring by the computer.

Furthermore, although in a plurality of flowcharts used in the above description, a plurality of processes (processings) are described in sequence, an execution order performed in each example embodiment is not restricted to the order as described. In each example embodiment, an order of processes illustrated in drawings can be changed as long as there causes no problem to content in such a manner that, for example, each processing are performed in parallel and so on. Furthermore, each of the above example embodiments can be combined as long as contents do not contradict each other.

Although a part of or all of the above example embodiments can also be described below as supplementary referred to as "notes", it is not limited to below.

[Note 1]

Refer to the interference detection system according to the above first aspect.

[Note 2]

The interference detection system according to note 1, wherein the simultaneous frame extraction part extracts a radio frame demodulated within a predetermined time difference from the first radio frame, as the second radio frame demodulated simultaneously or almost simultaneously with the first radio frame.

[Note 3]

The interference detection system according to note 1 or 2, wherein the interference detection part uses a received signal strength indication of a radio frame demodulated by the radio frame acquisition apparatus to determine whether or not the first radio frame and the second radio frame are interfering with each other.

[Note 4]

The interference detection system according to any one of notes 1 to 3, wherein
the interference detection part uses the number of the radio frame acquisition apparatuses which have demodulated the radio frame(s) for determination of whether or not the first radio frame and the second radio frame are interfering with each other.

[Note 5]

The interference detection system according to any one of notes 1 to 4, wherein
the interference detection apparatus further comprises a terminal relationship determination part which determines that a first radio communication terminal which has transmitted the first radio frame and a second radio communication terminal which has transmitted the second radio frame are in a relationship of the terminals (hidden terminals)located outside a reachable range of each other's radio wave, or of the terminals (exposed terminals)located within a reachable range of each other's radio wave, on the basis of determination of presence or absence of interference between the first radio frame and the second radio frame in the interference detection part.

[Note 6]

The interference detection system according to note 5, wherein the interference detection apparatus further comprises:
a position acquisition part which acquires respective positions of a plurality of radio communication terminals;
an inter-position interference determination part which determines whether or not a radio frame transmitted from a radio communication terminal located at a first position reaches a radio communication terminal located at a second position at a predetermined or higher strength on the basis of the positions of a plurality of the radio communication terminals acquired by the position acquisition part and a determination result by the terminal relationship determination part.

[Note 7]

The interference detection system according to note 3, wherein the interference detection part in advance calculates an average value of the received signal strength indications for each of a plurality of the radio frame acquisition apparatuses, and if a difference between the average values of the received signal strength indications of each of a first radio frame acquisition apparatus and a second radio frame acquisition apparatus is within a predetermined range and there exists no radio frame acquisition apparatus which has demodulated the first radio frame and the second radio frame simultaneously or almost simultaneously, suspends determination of interference with respect to the first radio frame and the second radio frame.

[Note 8]

The interference detection system according to note 4, wherein the interference detection apparatus calculates a demodulation rate of radio frames at each of a plurality of the radio frame acquisition apparatus under a condition that interference of the radio frames is not occurring, and if there exists no radio frame acquisition apparatus which has a demodulation rate of radio frames transmitted from the first and second the radio communication terminals are greater than or equal to a predetermined value and there is no radio frame acquisition apparatus which has demodulated simultaneously or almost simultaneously the first and the second radio frames, suspends determination of interference with respect to the first radio frame and the second radio frame.

[Note 9]

The interference detection system according to any one of notes 1 to 8, wherein, the interference detection part, in place of determining whether or not there exists a radio frame acquisition apparatus which has demodulated simultaneously or almost simultaneously the first and the second radio frame, determines whether or not the first radio frame and the second radio frame is interfering with each other on the basis of the number of radio frame acquisition apparatuses which have demodulated identical radio frames.

[Note 10]

The interference detection system according to any one of notes 1 to 8, wherein the interference detection part, in place of determining whether or not there exists a radio frame acquisition apparatus which has demodulated simultaneously or almost simultaneously the first radio frame and the second radio frame, determines whether or not the first radio frame and the second radio frames are interfering with each other on the basis of whether or not the first radio frame has been re-transmitted.

[Note 11]

The interference detection system according to note 10, wherein the interference detection part determines whether or not the first radio frame has been re-transmitted if there exists no radio frame acquisition apparatus which has simultaneously acquired the first radio frame and a non-identical radio frame observed simultaneously.

[Note 12]

Refer to the interference detection apparatus according to the above second aspect.

[Note 13]

Refer to the interference detection method according to the above third aspect.

[Note 14]

Refer to the interference detection program according to the above fourth aspect.

Please note that modes from the twelfth to fourteenth notes can be expanded to modes from the second to eleventh notes as is the case with a mode of the first note.

Please note that each disclosure of the above cited Patent Literatures etc. is incorporated herein by reference thereto. Variations and adjustments of the example embodiments and examples are possible within the scope of the overall disclosure (including the claims) of the present invention and on the basis of the basic technical concept of the present invention. Furthermore, various combinations and selections (including partial deletion) of various disclosed elements (including each of the elements in each of the claims, each of example embodiments, each of examples, each of drawings, etc.) are possible within the scope of the entire disclosure of the present invention. Namely, the present invention of course includes various variations and modifications that could be made by those skilled in the art according to the overall disclosure including the claims and the technical concept. In particular, with respect to the numerical ranges described herein, any numerical values or small range(s) included in the ranges should be construed as being expressly described even if not explicitly mentioned. Furthermore, each disclosure of above cited documents and also using a part or all thereof by combining with the disclosure of the present application are regarded as being included in the disclosure of the present application, as necessary, in accordance with the intent of the present invention, as a part of the disclosure of the present invention.

SIGNS LIST 10, 10-1, 10-2, 11 radio frame acquisition apparatus
12, 20, 21, 22 interference detection apparatus
30, 30-1, 30-2 network
40, 40-1, 40-2 access point
50, 50-1, 50-2 radio communication terminal
101, 121 radio frame acquisition part
102, 122 radio frame information transmission part
201, 123 radio frame information reception part
202, 124 radio frame information storage part
203, 125, 213 simultaneous frame extraction part
204, 126 interference detection part
215 terminal relationship determination part
226 position acquisition part
227 inter-position interference determination part
301 CPU (Central Processing Unit)
302 memory
303 input/output interface
304 NIC (Network Interface Card)

What is claimed is:

1. An interference detection system comprising:
a plurality of radio frame acquisition apparatuses; and
an interference detection apparatus,
wherein
each of the plurality of the radio frame acquisition apparatuses comprises a first processor and a first memory storing first instructions executable by the first processor to:
demodulate received radio frames; and
transmit radio frame information that has been acquired to the interference detection apparatus, and
wherein
the interference detection apparatus comprises a second processor and a second memory storing second instructions executable by the second processor to:

receive the radio frame information transmitted from the plurality of the radio frame acquisition apparatuses;

store the received radio frame information;

extract a first radio frame and a second radio frame demodulated at least substantially simultaneously with the first radio frame;

determine whether or not the first radio frame and the second radio frame are interfering with each other based on whether or not one of the plurality of radio frame acquisition apparatuses has demodulated the first radio frame and the second radio frame at least substantially simultaneously;

determine whether a first radio communication terminal which has transmitted the first radio frame and a second radio communication terminal which has transmitted the second radio frame are outside a reachable range of radio waves of each other, or whether the first radio communication terminal and the second radio communication terminal are within the reachable range, based on presence or absence of interference between the first radio frame and the second radio frame;

acquire positions of a plurality of radio communication terminals including the first radio communication terminal and the second communication terminal; and determine whether or not a radio frame transmitted from a radio communication terminal located at a first position reaches a different radio communication terminal located at a second position at a predetermined or higher strength based on the positions of the plurality of the radio communication terminals and whether the first radio communication terminal and the second radio communication terminal are outside or within the reachable range.

2. The interference detection system according to claim 1, wherein
the second processor extracts a radio frame demodulated within a predetermined time difference from the first radio frame, as the second radio frame.

3. The interference detection system according to claim 1, wherein
the second processor uses a received signal strength indication of a radio frame demodulated by the radio frame acquisition apparatuses to determine whether or not the first radio frame and the second radio frame are interfering with each other.

4. The interference detection system according to claim 3, wherein
the second processor calculates in advance an average value of the signal strength indication for each of the plurality of the radio frame acquisition apparatuses, and if a difference between the average value of the received signal strength indication of each of a first radio frame acquisition apparatus and a second radio frame acquisition apparatus is within a predetermined range and there is no radio frame acquisition apparatus which has demodulated the first radio frame and the second radio frame at least substantially simultaneously, suspends determination of interference with respect to the first radio frame and the second radio frame.

5. The interference detection system according to claim 1, wherein
the second processor uses a number of the radio frame acquisition apparatuses which have demodulated the radio frames to determine whether or not the first radio frame and the second radio frame are interfering with each other.

6. An interference detection apparatus comprising:
a processor; and
a memory storing instructions executable by the processor to:
store radio frame information with respect to radio frames acquired by each of a plurality of radio frame acquisition apparatuses;

extract a first radio frame, and a second radio frame demodulated at least substantially simultaneously with the first radio frame;

determine whether or not the first radio frame and the second radio frame are interfering with each other based on whether or not one of the plurality of radio frame acquisition apparatuses has demodulated the first radio frame and the second radio frame at least substantially simultaneously;

determine whether a first radio communication terminal which has transmitted the first radio frame and a second radio communication terminal which has transmitted the second radio frame are outside a reachable range of radio waves of each other, or whether the first radio communication terminal and the second radio communication terminal are within the reachable range, based on presence or absence of interference between the first radio frame and the second radio frame;

acquire positions of a plurality of radio communication terminals including the first radio communication terminal and the second communication terminal; and determine whether or not a radio frame transmitted from a radio communication terminal located at a first position reaches a different radio communication terminal located at a second position at a predetermined or higher strength based on the positions of the plurality of the radio communication terminals and whether the first radio communication terminal and the second radio communication terminal are outside or within the reachable range.

7. The interference detection apparatus according to claim 6, wherein
the processor extracts a radio frame demodulated within a predetermined time difference from the first radio frame, as the second radio frame.

8. The interference detection apparatus according to claim 6, wherein
the processor uses a received signal strength indication of a radio frame demodulated by the radio frame acquisition apparatuses to determine whether or not the first radio frame and the second radio frame are interfering with each other.

9. The interference detection apparatus according to claim 8, wherein
the processor calculates in advance an average value of the signal strength indication for each of the plurality of the radio frame acquisition apparatuses, and if a difference between the average value of the received signal strength indication of each of a first radio frame acquisition apparatus and a second radio frame acquisition apparatus is within a predetermined range and there is no radio frame acquisition apparatus which has demodulated the first radio frame and the second radio frame at least substantially simultaneously, suspends determination of interference with respect to the first radio frame and the second radio frame.

10. The interference detection apparatus according to claim 6, wherein
the processor uses a number of the radio frame acquisition apparatuses which have demodulated the radio frames to determine whether or not the first radio frame and the second radio frame are interfering with each other.

11. An interference detection method for an interference detection system which detects interference of radio waves, comprising:
   demodulating radio frames;
   storing radio frame information with respect to the demodulated radio frames;
   extracting a first radio frame, and a second radio frame demodulated simultaneously or almost simultaneously with the first radio frame, from the stored radio frame information;
   determining whether or not the first radio frame and the second radio frame are interfering with each other based on the basis of whether or not one of a plurality of radio frame acquisition apparatuses has demodulated the first radio frame and the second radio frame at least substantially simultaneously;
   determining whether a first radio communication terminal which has transmitted the first radio frame and a second radio communication terminal which has transmitted the second radio frame are outside a reachable range of radio waves of each other, or whether the first radio communication terminal and the second radio communication terminal are within the reachable range, based on presence or absence of interference between the first radio frame and the second radio frame;
   acquiring positions of a plurality of radio communication terminals including the first radio communication terminal and the second communication terminal; and
   determining whether or not a radio frame transmitted from a radio communication terminal located at a first position reaches a different radio communication terminal located at a second position at a predetermined or higher strength based on the positions of the plurality of the radio communication terminals and whether the first radio communication terminal and the second radio communication terminal are outside or within the reachable range.

12. The interference detection method according to claim 11, wherein
   the second radio frame demodulated at least substantially simultaneously with the first radio frame is a radio frame demodulated within a predetermined time difference from the first radio frame.

13. The interference detection method according to claim 11, wherein
   in determining whether or not the first radio frame and the second radio frame are interfering with each other, a received signal strength indication of a radio frame demodulated by the radio frame acquisition apparatuses is used.

14. A non-transitory computer-readable recording medium storing an interference detection program executable by a computer to perform processing:
   storing radio frame information with respect to radio frames acquired by each of a plurality of radio frame acquisition apparatuses;
   extracting a first radio frame, and a second radio frame demodulated simultaneously or almost simultaneously with the first radio frame, from the stored radio frame information;
   determining whether or not the first radio frame and the second radio frame are interfering with each other based on the basis of whether or not one of the plurality of radio frame acquisition apparatuses has demodulated the first radio frame and the second radio frame at least substantially simultaneously;
   determining whether a first radio communication terminal which has transmitted the first radio frame and a second radio communication terminal which has transmitted the second radio frame are outside a reachable range of radio waves of each other, or whether the first radio communication terminal and the second radio communication terminal are within the reachable range, based on presence or absence of interference between the first radio frame and the second radio frame;
   acquiring positions of a plurality of radio communication terminals including the first radio communication terminal and the second communication terminal; and
   determining whether or not a radio frame transmitted from a radio communication terminal located at a first position reaches a different radio communication terminal located at a second position at a predetermined or higher strength based on the positions of the plurality of the radio communication terminals and whether the first radio communication terminal and the second radio communication terminal are outside or within the reachable range.

15. The non-transitory computer-readable recording medium according to claim 14, wherein
   the second radio frame demodulated at least substantially simultaneously with the first radio frame is a radio frame demodulated within a predetermined time difference from the first radio frame.

16. The non-transitory computer-readable recording medium according to claim 14, wherein
   in determining whether or not the first radio frame and the second radio frame are interfering with each other, a received signal strength indication of a radio frame demodulated by the radio frame acquisition apparatuses is used.

* * * * *